(12) United States Patent
Sharma et al.

(10) Patent No.: US 9,194,706 B2
(45) Date of Patent: Nov. 24, 2015

(54) METHOD AND SYSTEM FOR IDENTIFYING A DIRECTIONAL HEADING OF A VEHICLE

(75) Inventors: Ankit Sharma, Bangalore (IN); Ajith Kuttannair Kumar, Erie, PA (US); Vishram Vinayak Nandedkar, Bangalore (IN)

(73) Assignee: General Electric Company, Schenectady, NY (US)

(*) Notice: Subject to any disclaimer, the term of this patent is extended or adjusted under 35 U.S.C. 154(b) by 412 days.

(21) Appl. No.: 13/600,942

(22) Filed: Aug. 31, 2012

(65) Prior Publication Data

US 2013/0261856 A1    Oct. 3, 2013

Related U.S. Application Data

(63) Continuation-in-part of application No. 13/431,711, filed on Mar. 27, 2012, now Pat. No. 8,862,291.

(51) Int. Cl.
*G05D 1/00* (2006.01)
*G01C 21/00* (2006.01)
*B61L 25/02* (2006.01)
*G01C 21/30* (2006.01)

(52) U.S. Cl.
CPC .............. *G01C 21/005* (2013.01); *B61L 25/023* (2013.01); *B61L 25/025* (2013.01); *B61L 25/026* (2013.01); *G01C 21/30* (2013.01); *B61L 2205/04* (2013.01)

(58) Field of Classification Search
CPC . B61L 2205/04; B61L 25/025; B61L 25/026; B61L 23/34; B61L 25/021; B61L 25/023; B61L 27/0016; B61L 27/0022; B61L 27/0027; B61L 29/24; B61L 3/06; G01C 21/005; G01C 21/30

USPC ..................... 701/19, 117, 301, 408
See application file for complete search history.

(56) References Cited

U.S. PATENT DOCUMENTS

| | | | |
|---|---|---|---|
| 5,828,979 A * | 10/1998 | Polivka et al. | 701/117 |
| 6,128,558 A * | 10/2000 | Kernwein | 701/19 |
| 6,360,998 B1 * | 3/2002 | Halvorson et al. | 246/122 R |
| 6,377,215 B1 * | 4/2002 | Halvorson et al. | 342/458 |
| 7,557,748 B1 | 7/2009 | Zahm | |
| 7,650,207 B2 | 1/2010 | Metzger | |

(Continued)

OTHER PUBLICATIONS

J. Brawner et al., Magnetometer Sensor Feasibility for Railroad and Highway Equipment Detection, HR IDEA Program Final Report, Jun. 24, 2006, IDEA Programs, Washington, D.C.

*Primary Examiner* — Redhwan k Mawari
(74) *Attorney, Agent, or Firm* — GE Global Patent Operation; John A. Kramer

(57) ABSTRACT

A system for confirming a direction of travel of a vehicle includes a location determining system and a control unit. The location determining system is configured to be coupled to a vehicle that travels in a network of plural route segments having fixed positions. The location determining system also is configured to obtain data representative of a measured heading of the vehicle. The measured heading represents a direction of travel of the vehicle. The control unit is configured to receive a designated route segment that is at least one of selected by operator input or provided by a trip plan that designates operational settings of the vehicle for a trip. The control unit is configured to compare the measured heading of the vehicle with one or more designated headings associated with the route segments to verify whether the vehicle is actually traveling on the designated route segment.

5 Claims, 8 Drawing Sheets

(56) References Cited

U.S. PATENT DOCUMENTS

| | | | |
|---|---|---|---|
| 2002/0088904 A1* | 7/2002 | Meyer | 246/124 |
| 2002/0091483 A1* | 7/2002 | Douet | 701/207 |
| 2006/0109166 A1* | 5/2006 | Arthur et al. | 342/29 |
| 2011/0118979 A1* | 5/2011 | Mao et al. | 701/208 |
| 2013/0261856 A1* | 10/2013 | Sharma et al. | 701/19 |

* cited by examiner

METHOD AND SYSTEM FOR IDENTIFYING A DIRECTIONAL HEADING OF A VEHICLE

CROSS-REFERENCE TO RELATED APPLICATIONS

This application is a continuation-in-part of U.S. patent application Ser. No. 13/431,711, which was filed on 27 Mar. 2012, now U.S. Pat. No. 8,862,291 and is entitled "Method And System For Identifying A Directional Heading Of A Vehicle" (the "'711 application"). The entire disclosure of the '711 application is incorporated by reference into this application.

BACKGROUND

Some known vehicles monitor the geographic locations of the vehicles as the vehicles move. For example, some rail vehicles travel according to schedules or plans that dictate where the rail vehicles move. As another example, some automobiles move (or are controlled to move) according to direction from global positioning systems (GPS) that dictate where the automobiles are to travel.

A vehicle may travel through intersections or points of divergence where a route or path that the vehicle is currently traveling along splits or divides into multiple different routes or paths. The schedules or plans of the vehicle may direct the vehicle to travel along a particular or designated route of the several routes or paths. Due to operator error, malfunctioning equipment (e.g., malfunctioning switches at a railway), and the like, however, the vehicle may take a different route or path and diverge away from the designated path or route.

Some known systems use the longitude and latitude data provided by GPS to determine if the vehicles are traveling on the correct or designated path or route. For example, these systems may obtain a longitude and latitude from a GPS receiver that represents the location of the vehicle at a point in time. The systems can then use this longitude and latitude in an attempt to determine where the vehicle is along a route. But, the resolution of GPS may be limited such that the systems may be unable to determine if the vehicle is on the correct path or route until the vehicle has traveled a significant distance along the route. For example, in rail yards, the different tracks may be spaced closer together than the resolution of the GPS can distinguish between, and this close spacing may be maintained (e.g., in the case of parallel or non-intersecting adjacent tracks) for a significant distance. Similarly, at switch points (e.g., intersections of several routes or tracks at a switch), the routes or tracks may be relatively close together in the vicinity of the switch point. As a result, the GPS may be unable to determine which route or track the vehicle is traveling along.

BRIEF DESCRIPTION

In one embodiment, a system (e.g., for confirming a direction of travel of a vehicle) includes a location determining system and a control unit. The location determining system is configured to be coupled to a vehicle and to obtain data representative of a measured heading of the vehicle. The measured heading is representative of a direction of travel of the vehicle. The control unit is configured to receive a designated route segment of a set of route segments having fixed positions at an intersection. The designated route segment is at least one of selected by operator input or provided by a trip plan that designates operational settings of the vehicle for a trip. The designated route segment represents which of the route segments in the set that the vehicle is to travel along upon exiting the intersection. The control unit is configured to compare the measured heading of the vehicle with designated headings that are associated with the respective route segments in the set to verify whether the vehicle is actually traveling on the designated route segment when the vehicle exits the intersection.

In another embodiment, a method (e.g., for verifying which route segment is being traveled by a vehicle) includes obtaining a designated route segment of a set of route segments that meet at an intersection. The designated route segment represents which of the route segments in the set that a vehicle is to travel along upon exiting the intersection. The designated route segment is provided by at least one of operator input or a trip plan that designates operational settings of the vehicle for a trip. The method also includes identifying a measured heading of the vehicle based on heading data obtained by a global positioning system (GPS). The measured heading is representative of a direction of movement of the vehicle. The method also includes determining if the vehicle is traveling on the designated route segment by comparing the measured heading with designated headings associated with the respective route segments in the set.

In another embodiment, a system (e.g., for verifying whether a rail vehicle is traveling on a designated track segment) includes a global positioning system (GPS) and a control unit. The GPS receiver is configured to be coupled to a rail vehicle and to generate heading data representative of a direction of travel of the rail vehicle. The control unit is configured to be communicatively coupled with the GPS receiver and to obtain a measured heading of the rail vehicle during travel of the rail vehicle through an intersection of a set of track segments based on the heading data. The control unit also is configured to obtain a designated track segment of the set of track segments that is provided by at least one of operator input or a trip plan that designates operational settings of the rail vehicle for a trip. The designated track segment represents which of the track segments in the set that the rail vehicle is to travel along upon exiting the intersection. The control unit also is configured to determine whether the rail vehicle is traveling on the designated track segment after traveling through the intersection by comparing the measured heading of the rail vehicle with designated headings associated with respective track segments of the set of track segments.

In another embodiment, a system (e.g., for determining which route segment that a vehicle is traveling along) includes a location determining system and a control unit. The location determining system is configured to be coupled to a vehicle and to obtain data representative of measured headings of the vehicle. The measured headings represent one or more directions of travel of the vehicle. The control unit is configured to receive a designated route segment of a set of route segments including at least a first route segment and a second route segment that are joined by an interconnecting route segment at an intersection. The first route segment and the second route segment are laterally spaced apart from each other by a separation distance. The control unit also is configured to determine one or more displacement distances based on the measured headings of the vehicle and one or more velocities of the vehicle. The displacement distances represent distances that the vehicle travels toward the second route segment from the first route segment along the interconnecting portion. Additionally, the control unit is configured to determine whether the vehicle traveled from the first route segment to the second route segment by comparing the one or more displacement distances to the separation distance.

In another embodiment, a system (e.g., for verifying a route segment that a vehicle is traveling along) includes a magnetic sensor and a control unit. The magnetic sensor may include an anisotropic magneto-resistance sensor, or AMR sensor. Alternatively, the magnetic sensor may include another type of sensor. The magnetic sensor is configured to be coupled to the vehicle that travels in a network of plural route segments having fixed positions. The magnetic sensor also is configured to generate an output signal based on an orientation of the magnetic sensor relative to an external magnetic field. The control unit is configured to receive the output signal from the magnetic sensor and an operator-designated route segment. The operator-designated route segment represents a selected route segment of the route segments that is identified by the operator as being the route segment on which the vehicle is traveling. The control unit also is configured to identify a directional heading of the vehicle based on the output signal from the magnetic sensor and to determine an actual route segment of the route segments in the network that the vehicle is actually traveling along based on the directional heading of the vehicle. The control unit is further configured to verify that the actual route segment on which the vehicle is actually traveling is the selected route segment.

In another embodiment, a method (e.g., for verifying a route segment that a vehicle is traveling along) includes receiving an operator-designated route segment from an operator of the vehicle when the vehicle is traveling in a network of plural route segments having fixed positions. The operator-designated route segment represents a selected route segment of the route segments that is identified by the operator as being the route segment on which the vehicle is traveling. The method also includes generating an output signal that is based on an orientation of a magnetic sensor relative to an external magnetic field, identifying a directional heading of the vehicle based on the output signal, determining an actual route segment of the route segments that the vehicle is actually traveling along based on the directional heading of the vehicle, and comparing the actual route segment with the selected route segment to determine if the vehicle is traveling on the selected route segment.

In another embodiment, another system (e.g., for verifying a track segment that a rail vehicle is traveling along) includes a magnetic sensor and a control unit. The magnetic sensor is configured to be coupled to a rail vehicle and to generate an output signal representative of an orientation of the magnetic sensor relative to an external magnetic field. The control unit is configured to be communicatively coupled with the magnetic sensor and to receive the output signal from the magnetic sensor and an operator-selected track segment representative of a selected track segment on which the operator identifies that the rail vehicle is traveling. The control unit is further configured to determine a directional heading of the rail vehicle based on the output signal of the magnetic sensor. The control unit also is configured to determine an actual track segment on which the rail vehicle is actually traveling after the rail vehicle passes through an intersection of track segments based on the directional heading and based on relative orientations of the track segments. The control unit is further configured to compare the actual track segment with the selected track segment to verify whether the rail vehicle is traveling on the selected track segment.

BRIEF DESCRIPTION OF THE DRAWINGS

The present inventive subject matter will be better understood from reading the following description of non-limiting embodiments, with reference to the attached drawings, wherein below.

DETAILED DESCRIPTION

One or more embodiments of the inventive subject matter described herein provide systems and methods that identify directional headings of vehicles based on output signals from magnetic sensors coupled to the vehicles. In one aspect, a route (e.g., a road, track, and the like) upon which a vehicle is traveling may be identified from several potential routes based on the directional headings identified from signals generated by the magnetic sensor. For example, in a network of routes such as tracks upon which rail vehicles travel, some tracks may be spaced relatively close together at or near an intersection. When a rail vehicle travels through the intersection and onto one of the tracks, the track on which the rail vehicle travels can be identified based on an output signal from a magnetic sensor and/or known locations or orientations of the fixed positions of the tracks. While the discussion herein focuses on rail vehicles and tracks, alternatively, one or more embodiments may relate to other vehicles, such as automobiles, and roads. For example, the directional headings determined from the magnetic sensors may be used to determine which lane of a multi-lane road that an automobile is traveling along.

One or more additional or alternative embodiments of the inventive subject matter provide systems and methods that use directional headings of vehicles that are obtained from a GPS receiver to confirm which route a vehicle is traveling along when the vehicle travels through a switch point. As used herein, the terms "switch point" and "intersection" include a location where multiple routes or route segments meet, and which may include a switch that controls which route or route segments that a vehicle travels on when the vehicle passes over the switch. The vehicle may be traveling according to a designated trip plan that directs which routes the vehicle is to travel along, including which route segments that the vehicle is to travel on when passing through a switch point. When the vehicle actually travels over the switch point, heading data provided by the GPS receiver onboard the vehicle may be used to determine which route segment that the vehicle is traveling along after the switch point, such as to confirm that the vehicle is following the trip plan or is taking a different route segment than the segment designated by the trip plan.

Figure 1:
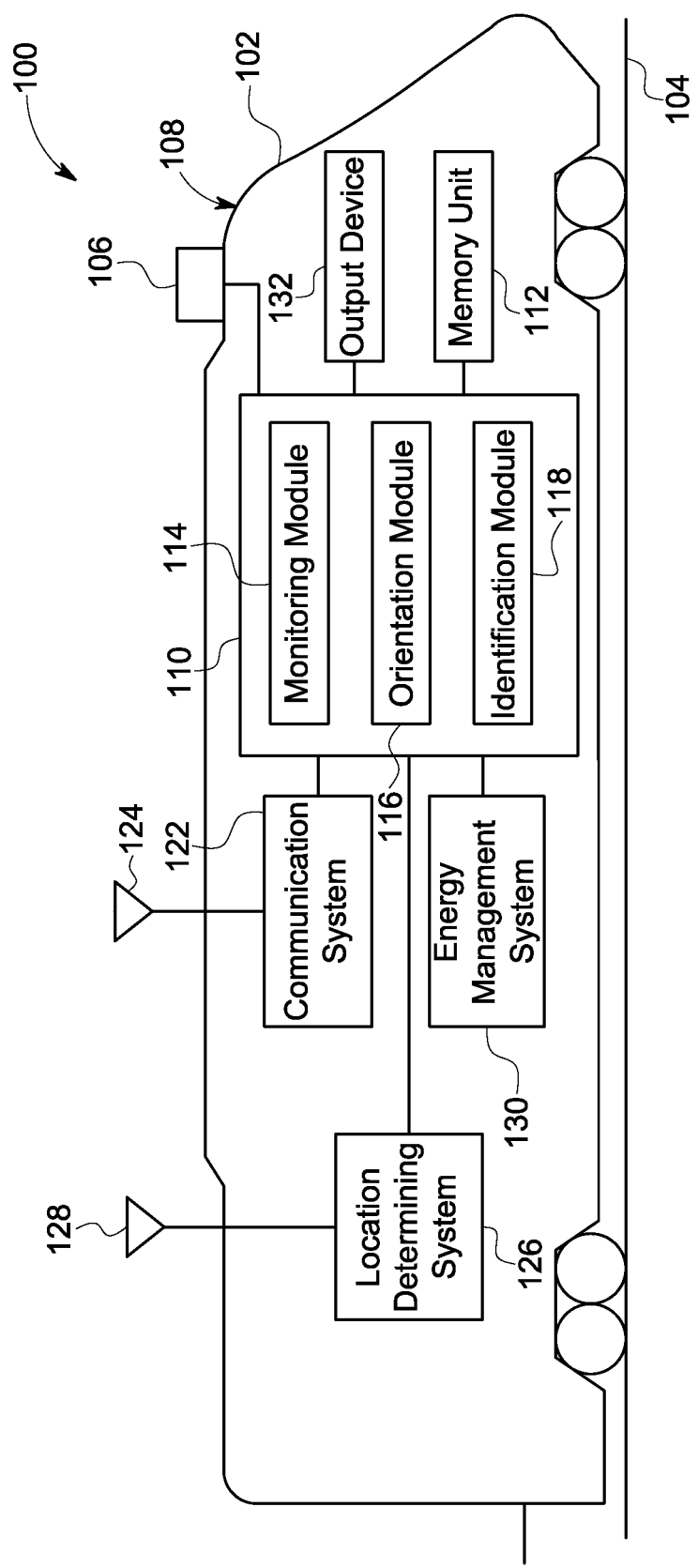
FIG. 1 is a schematic view of one embodiment of a vehicle system.

FIG. 1 is a schematic view of one embodiment of a vehicle system 100. The system 100 includes a vehicle 102 that travels along a route 104. In the illustrated embodiment, the vehicle represents a powered rail vehicle, such as a locomotive, that travels along a track. Alternatively, the vehicle 102 may represent another rail vehicle, such as a consist of locomotives, a train comprising one or more locomotives and one or more non-powered (e.g., incapable of self-propulsion) rail cars, and the like. In another embodiment, the vehicle 102 may represent another type of powered vehicle that is capable of self propulsion, such as an automobile, an off-highway vehicle other than a rail vehicle, and the like. The route 104 may represent a track, a road, and the like, over which the vehicle 102 travels. In one embodiment, the position of the route 104 is fixed. For example, the location of a road or track may be physically fixed to a known geographic location and orientation, in contrast to routes in bodies of water and/or in the air, which are not physically fixed to a known geographic location and/or orientation. By "fixed," it is meant that the route 104 is coupled with one or more tangible bodies (e.g., the surface of the earth, spans supported by bridges, and the like) such that the vehicle 102 is physically constrained in regards to at least part of its travel along the route.

A magnetic sensor 106 is disposed onboard the vehicle 102 to generate output signals that represent an orientation of the sensor 106 relative to an external magnetic field. In one embodiment, the sensor 106 creates electric output signals having frequencies and/or voltages that are based on the orientation of the sensor 106 along one or more orthogonal axes relative to the magnetic field of the earth. For example, as the vehicle 102 moves along the route 104, the sensor 106 can generate output signals that represent the orientation of the sensor 106 relative to the earth's magnetic field. The sensor 106 can be coupled to an exterior surface 108 of the vehicle 102 so that the sensor 106 is not disposed inside the vehicle 102. Positioning the sensor 106 outside the vehicle 102 can reduce interference with measurements made by the sensor 106 and/or can reduce electromagnetic shielding of the sensor 106, which may reduce the accuracy of measurements made by the sensor 106. In one embodiment, the sensor 106 is fixed to the vehicle 102 so that changes in orientation of the vehicle 102 (e.g., when the vehicle 102 turns, changes routes 104, and/or follows a curved route 104) result in similar, if not identical, changes in orientation of the sensor 106.

Alternatively, the sensor 106 may be coupled with or disposed at a steerable part of the vehicle 102. For example, the sensor 106 may be disposed on a truck of a locomotive, steering wheel of an automobile, or other component of the vehicle 102 that turns or moves relative to or ahead of the vehicle 102 moving or turning.

A single sensor 106 may be coupled to the vehicle 102 in one embodiment to determine changes in directional headings of the vehicle 102 in a single two dimensional plane. Alternatively, two or more sensors 106 may be coupled to the vehicle 102. For example, multiple sensors 106 may be coupled to the vehicle 102 and oriented relative to each other such that different sensors 106 generate signals representative of movement of the vehicle 102 along different planes or axes. In one embodiment, a first sensor 106 may be oriented relative to the vehicle 102 to generate output signals (as described below) that represent movement of the vehicle 102 in a first two dimensional plane (e.g., the x-y plane in the x-y-z orthogonal system), a second sensor 106 may be oriented relative to the vehicle 102 to generate output signals that represent movement of the vehicle 102 in a second two dimensional plane (e.g., the y-z plane), a third sensor 106 may be oriented relative to the vehicle 102 to generate output signals that represent movement of the vehicle 102 in a third two dimensional plane (e.g., the x-z plane), and the like.

A control unit 110 onboard the vehicle 102 is communicatively coupled (e.g., by one or more wired and/or wireless connections) with the sensor 106 to receive the output signals from the sensor 106. As used herein, the terms "unit" or "module" include a hardware and/or software system that operates to perform one or more functions. For example, a unit or module may include one or more computer processors, controllers, and/or other logic-based devices that perform operations based on instructions stored on a tangible and non-transitory computer readable storage medium, such as a computer memory. Alternatively, a unit or module may include a hard-wired device that performs operations based on hard-wired logic of a processor, controller, or other device. In one or more embodiments, a unit or module includes or is associated with a tangible and non-transitory (e.g., not an electric signal) computer readable medium, such as a computer memory. The units or modules shown in the attached figures may represent the hardware that operates based on software or hardwired instructions, the computer readable medium used to store and/or provide the instructions, the software that directs hardware to perform the operations, or a combination thereof.

The control unit 110 uses the output signals to identify a directional heading of the vehicle 102 in one embodiment. The directional heading can represent the angular orientation of the direction that the vehicle 102 is traveling relative to a direction of the external magnetic field (e.g., the earth's magnetic field). The term "direction" with respect to a magnetic field refers to a direction that extends from one magnetic pole (e.g., the north pole of the earth's magnetic field) to another magnetic pole (e.g., the south pole of the earth's magnetic field).

If the vehicle 102 is traveling east on a segment of the route 104 that linearly extends in an east-west direction, the control unit 110 can receive a first output signal from the sensor 106 that indicates a first angular orientation of the vehicle 102 relative to the direction of the earth's magnetic field. If the route 104 curves so that the route 104 extends in another direction or the vehicle 102 passes through an intersection or switch point to travel on another route 104 that extends in another direction (e.g., northeast or southeast), then the control unit 110 can receive a different, second output signal from the sensor 106 that indicates a changed, second angular orientation of the vehicle 102 relative to the direction of the earth's magnetic field.

The control unit 110 is shown as including several modules 114, 116, 118 that perform various functions of the control unit 110. A monitoring module 114 receives the output signals from the sensor 106. In one embodiment, the monitoring module 114 examines the output signals to identify output signals that are representative of mechanical vibrations or other mechanical movement of the vehicle 102 other than the movement of the vehicle 102 along the route 104. For example, the monitoring module 114 can examine the output signals and/or changes in the output signals to determine if mechanical vibrations of the vehicle 102 are caused by movement of the vehicle 102 along the route 104 or are indicative of damage or mechanical breakdown of the vehicle 102 (e.g., to a suspension system of the vehicle 102) and/or the route 104 (e.g., damaged rails or road). As described below, the monitoring module 114 can monitor electrical characteristics (such as frequencies and/or voltages) of the output signals to determine if the characteristics are indicative of any mechanical problems or faults of the vehicle 102 and/or routes 104.

An orientation module 116 examines the output signals to determine a directional heading of the vehicle 106. The orientation module 116 can receive an output signal and correlate the output signal (e.g., using a lookup table, equation, or other relationship) to an angular orientation of the sensor 106 and vehicle 102 relative to the direction of the external magnetic field, as described below.

An identification module 118 receives the directional heading from the orientation module 116 and determines which route 104 or segment of routes 104 that the vehicle 102 is traveling along. The identification module 118 may refer to a database, table, or other data structure in a memory unit 112 that stores designated, known, or previously measured locations and relative geographic orientations of the routes 104 and/or segments of the routes 104. The memory unit 112 can include or represent one or more computer readable storage media, such as computer hard drives, random access memory, read only memory, and the like. The memory unit 112 can store previously determined or designated locations and/or orientations of the routes 104 on which the vehicle 102 travels. For example, the memory unit 112 can store at least a portion of a route database that includes information on where various segments of routes 104 are located (e.g., such as by longitude, latitude, or other identifying information), relative geographic orientations of the route segments (e.g., a first route segment is oriented at an angle of five degrees with respect to an intersecting second route segment), and the like.

The identification module 118 can use the identified directional heading of the vehicle 102 to identify which route 104 or segment of a route 104 that the vehicle 102 is traveling along. As described below, when the vehicle 102 moves from one route segment to another (such as by passing through an intersection or switch), the identification module 118 can use the identified directional heading and the relative geographic orientations of the route segments in order to determine or verify which route segment the vehicle 102 is traveling along.

A communication system 122 includes hardware and circuitry (e.g., an antenna 124 and associated circuitry) for communicating with an off-board (e.g., remote) location. The communication system 122 can communicate data (such as identified heading orientations of the vehicle 102, output signals of the sensor 106, identified routes 104 that the vehicle 102 is traveling along, and the like) with a remote location, such as a dispatch facility or another vehicle 102. For example, if the control unit 110 determines which route 104 or route segment that the vehicle 102 is traveling along after the vehicle 102 passes through an intersection or switch, the communication system 122 can transmit the identified route 104 or route segment to one or more other vehicles 102 and/or other remote locations to notify the other vehicles 104 and/or remote locations of the presence of the vehicle 102 on that route 104 or route segment. The communication system 122 may communicate the identified directional headings to an off-board location and the off-board location can identify which route 104 or route segment on which the vehicle 102 is traveling. Alternatively, other data can be communicated to and/or from the vehicle 102 using the communication system 122.

A location determining system 126 can be disposed onboard the vehicle 102 to determine geographic locations of the vehicle 102 as the vehicle 102 moves along the route 104. The location determining system 126 can include or be communicatively coupled with antenna circuitry 128 (which may be different from or the same as the antenna circuitry 124) to receive location data from a remote location. For example, the location determining system 126 may include a receiver and associated circuitry of a GPS to determine locations of the vehicle 102, circuitry for locating the vehicle 102 relative to cellular transmission towers, and/or other circuitry, such as circuitry that receives wireless signals from a remote location that provide the location of the vehicle 102. The location determining system 126 may periodically determine a location of the vehicle 102 along a route 104 and/or may be prompted to determine locations of the vehicle 102 by the control unit 110. The location that is determined by the location determining system 126 may be referred to as a sensed location. The locations of the vehicle 102 and/or the associated times at which the locations are determined can be stored in the memory unit 112.

The vehicle 102 can include an energy management system (EMS) 130 that determines operational settings of the vehicle 102 to reduce fuel consumed and/or emissions generated by the vehicle 102. The EMS 130 may be embodied in a computer, computer processor, microcontroller, microprocessor, or other logic-based device, that operates based on one or more sets of instructions (e.g., software) stored on a tangible and non-transitory computer readable storage medium (e.g., hard drive, flash drive, ROM, or RAM). The EMS 130 can refer to trip data that represents information about a current or upcoming trip of the vehicle 102, vehicle data that represents characteristics of the vehicle 102, route data that represents information about the route or path on the route 104 on which the vehicle 102 is traveling or will travel, and/or other data. The trip data can include scheduling information, such as scheduled departure and/or arrival times of the vehicle 102. The vehicle data can include information such as the weight, length, power output, braking capacity, and the like, of the vehicle 102. The route data can include information such as the curvature and/or grade of one or more segments of the route taken by or that will be taken by the vehicle 102. The other data can include additional information that may impact the amount of fuel consumed or emissions generated by the vehicle 102, such as the weather (e.g., high winds), friction or adhesion of the vehicle 102 to the route 104, and the like. Based on this and/or other data, the EMS 130 may generate a trip plan that designates operational settings, such as power output, throttle settings, brake settings, and the like, for controlling movement of the vehicle 102 and which may be expressed as a function of time and/or distance along a route. By following the trip plan, the vehicle 102 may consume less fuel and/or generate fewer emissions relative to the vehicle 102 traveling according to one or more other plans. In another embodiment, the EMS 130 may receive the trip plan from an off-board (e.g., remote) location, such as a dispatch facility.

The EMS 130 may generate control signals that are communicated to the control unit 110. The control unit 110 may convert these control signals into signals that are usable by a propulsion system of the vehicle 102 (e.g., traction motors, brakes, and the like) to automatically control the tractive and/or braking output of the vehicle 102. Alternatively, the control signals may be communicated to an output device 132 to allow the presentation of instructions to the operator so that the operator may manually control operations of the vehicle 102 according to the trip plan.

The output device 132 can include a monitor, touch screen, speaker, haptic device (e.g., that vibrates or changes temperature), and the like. The output device 132 can present instructions to the operator of the vehicle 102 according to the trip plan, other instructions (e.g., safety limits) to the operator to control operations of the vehicle 102, directional headings of the vehicle 102, and the like.

Figure 2:
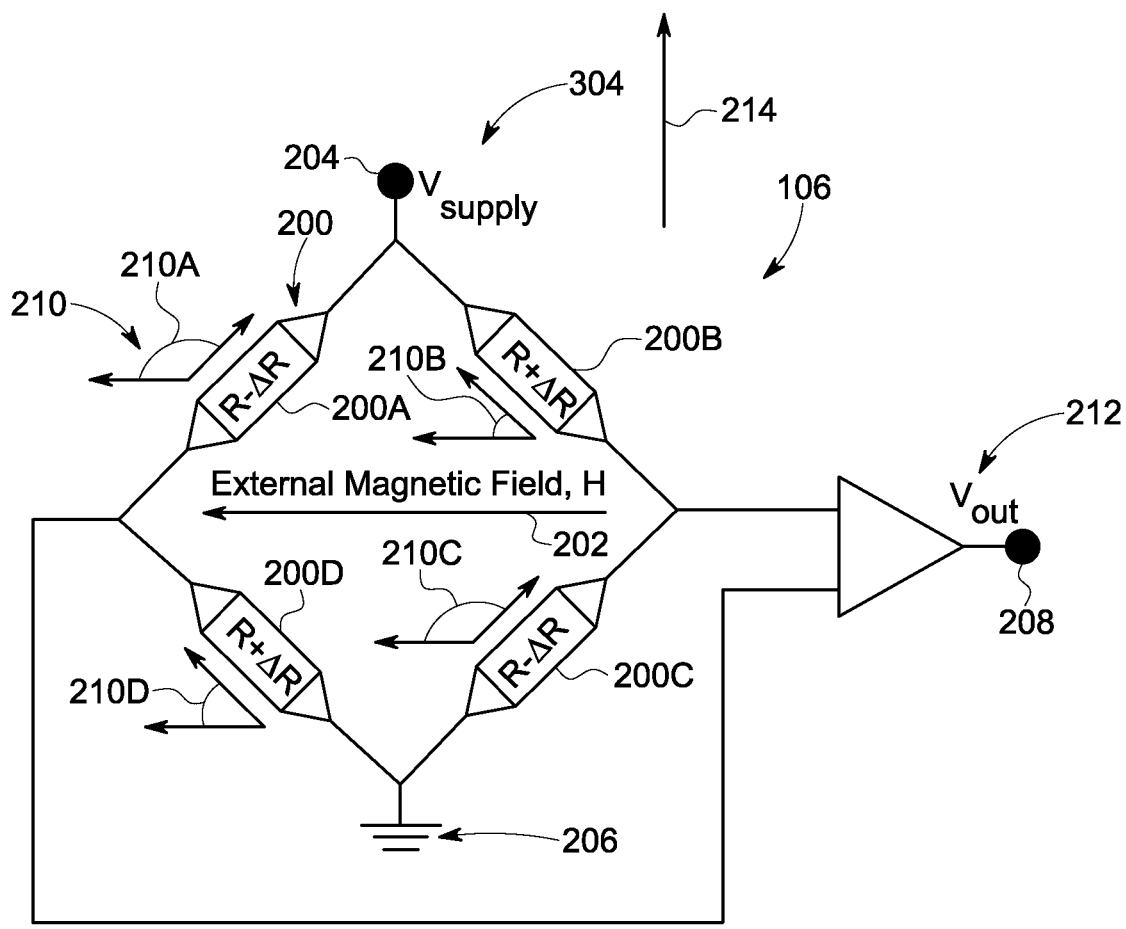
FIG. 2 is a circuit diagram of one embodiment of a magnetic sensor shown in FIG. 1.

FIG. 2 is a circuit diagram of one embodiment of the magnetic sensor 106. Although not shown in FIG. 2, the sensor 106 may include additional circuitry, such as signal conditioning circuitry and the like. In the illustrated embodiment, the sensor 106 includes several magnetically sensitive resistive components 200 conductively coupled with each other. The resistive components 200 have electrical resistance characteristics that change based on exposure to an external magnetic field 202 ("External Magnetic Field, H" in FIG. 2), such as the earth's magnetic field. For example, the resistance (R) of one or more of the resistive components 200 may change by a deviation amount ($\Delta R$) based on the orientation of the resistive component 200 relative to the direction of the external magnetic field 202. As the orientation of a resistive component 200 relative to the direction of the external magnetic field 202 changes, the deviation amount ($\Delta R$) may increase or decrease. The orientation of each resistive component 200 relative to the external magnetic field 202 is represented by an angular difference 210 (e.g., 210A, 210B, 210C, 210D) in FIG. 2.

Figure 3:
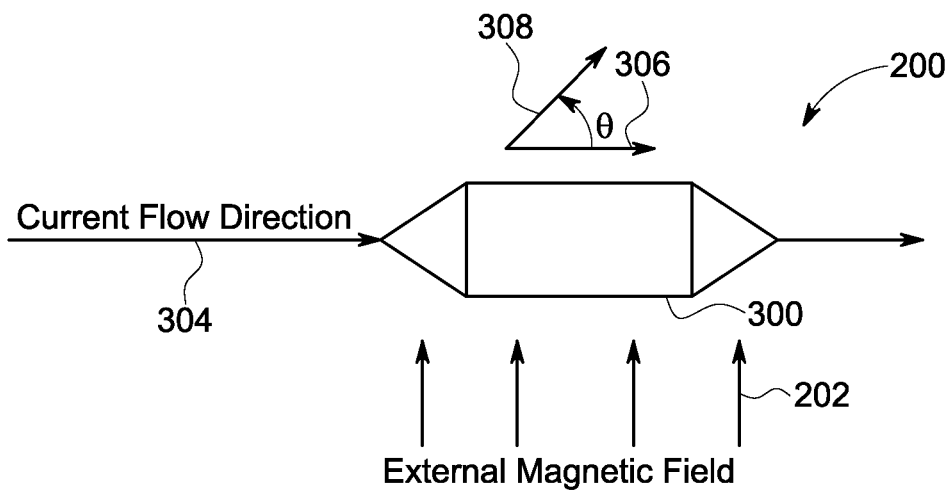
FIG. 3 is a schematic diagram of a resistive component shown in FIG. 2 in accordance with one embodiment.

FIG. 3 is a schematic diagram of the resistive component 200 in accordance with one embodiment. The resistive component 200 includes a resistor body 300 that resists the flow of electric current through the body 300. In one embodiment, the resistive component 200 is formed from a mixture of nickel (Ni) and iron (Fe). Alternatively, the resistive component 200 may include or be formed from one or more other materials. One or more conductors (not shown) extend through the body 300 and are capable of conducting a bias current 304 that is applied to the conductor 302 through the body 300.

The body 300 and conductors may provide the resistance (R) to the flow of the bias current 304 through the resistive component 200. The presence of the external magnetic field 202 can change the resistance (R) of the resistive component 200 by the deviation amount ($\Delta R$). As described above, the deviation amount ($\Delta R$) is based on the orientation (e.g., angle) 210 between the direction of the external magnetic field 202 and the resistive component 200. For example, orienting the resistive component 200 along (e.g., aligning the direction of elongation of the conductive body 302) a first direction 306 can cause the deviation amount ($\Delta R$) (and the total resistance, e.g., R+$\Delta R$ or R-$\Delta R$) to have a first value, while orienting the resistive component 200 along a different, second direction 308 can cause the deviation amount ($\Delta R$) (and the total resistance, e.g., R+$\Delta R$ or R-$\Delta R$) to have a different, second value.

Returning to the discussion of the sensor 106 shown in FIG. 2, several of the resistive components 200 may be conductively coupled with each other in the sensor 106. The resistive components 200 may be provided in a bridge arrangement, such as the Wheatstone bridge arrangement shown in FIG. 2. Alternatively, the resistive components 200 may be provided in another arrangement. The resistive components 200 are conductively coupled with a conductive input terminal 204, a conductive ground reference 206, and a conductive output terminal 208.

The bias current 304 ("$V_{supply}$" in FIG. 2) can be applied to the input terminal 204 to generate a bias field 214 from the flow of the bias current 304 through the sensor 106. Depending on the orientation of the resistive components 200A-D relative to the external magnetic field 202, the total resistance (R±$\Delta R$) of one or more of the resistive components 200A-D may vary. As a result, the flow of the bias current 304 through the sensor 106 to the output terminal 208 may change depending on the orientation of the sensor 106 (e.g., the orientation of the resistive components 200A-D). As the flow of the bias current 304 changes, an output signal 212 ("$V_{out}$" in FIG. 2) that is measured at and/or communicated from the output terminal 208 may change. Different output signals 212 may indicate different orientations of the sensor 106 relative to the external magnetic field 202.

Figure 4:
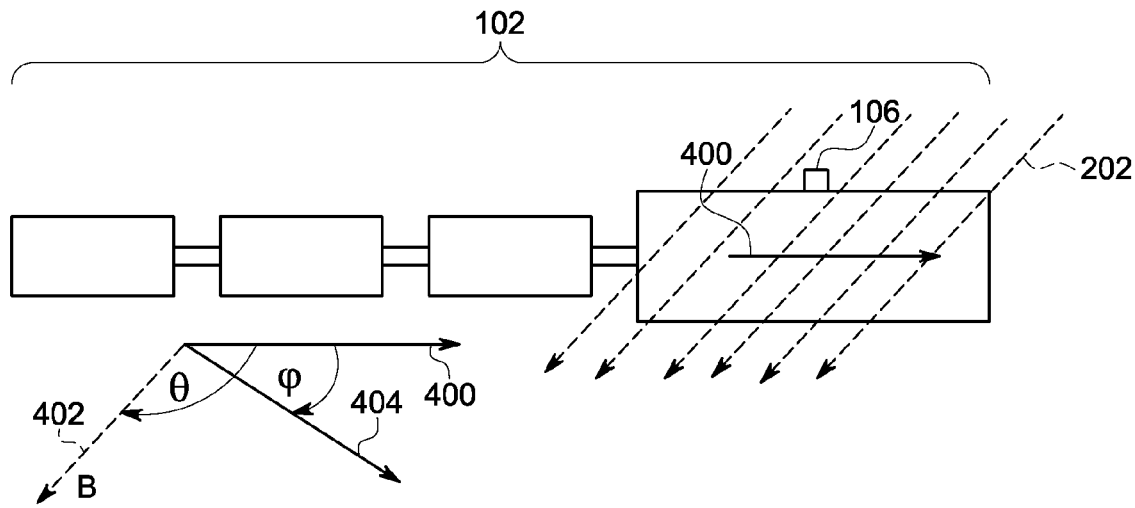
FIG. 4 is a schematic diagram of the vehicle shown in FIG. 1 changing directional heading to illustrate one example of changing output signals due to the changed directional heading.

FIG. 4 is a schematic diagram of the vehicle 102 changing directional heading to illustrate one example of changing output signals 212 (shown in FIG. 2) due to the changed directional heading. In the illustrated example, the vehicle 102 with the magnetic sensor 106 coupled thereto is traveling in a first directional heading 400 through the external magnetic field 202, such as the earth's magnetic field. The external magnetic field 202 in FIG. 4 is oriented (e.g., aligned from the north magnetic pole to the south magnetic pole) along a field direction 402 ("B"). In one embodiment, the output signal 212 generated by the sensor 106 can be based on an angle between the first directional heading 400 of the vehicle 102 and the field direction 402 of the external magnetic field 202. For example, the following relationship may be used to express a voltage output of the sensor 106 when the vehicle 102 is oriented along the first directional heading 400:

$$V_{out}=V_{bias}\times B\times\cos(\theta) \quad \text{(Eqn. \#1)}$$

where $V_{out}$ represents a voltage of the output signal 212 generated by the sensor 106, $V_{bias}$ represents the voltage that is applied as the bias current 304 (shown in FIG. 3), and $\theta$ represents an angle between the first directional heading 400 of the vehicle 102 (and/or the sensor 106) and the field direction 402 of the external magnetic field 202. One or more additional coefficients or values may be added, multiplied, subtracted, or divided into Equation #1. For example, one or more calibration or correction values may be used to correct any inaccuracies caused by the sensor 106 and/or other external factors. Alternatively, a trigonometric or other function other than cosine may be used in Equation #1.

If the vehicle 102 and/or sensor 106 change directional headings from the first directional heading 400 to a different, second directional heading 404, then the output signal 212 from the sensor 106 may change. As described above, the resistance of one or more resistive components 200 (shown in FIG. 2) in the sensor 106 may change with changing orientations relative to the field direction 402 of the external magnetic field 202. As a result, with a constant or approximately constant bias current 304 (shown in FIG. 3, which may be provided by a power source such as a battery, engine of the vehicle 102, overhead catenary, and the like), the resistance of one or more resistive components 200 may change when the directional heading changes from the first directional heading 400 to the second directional heading 404. Consequently, the output signal 212 (e.g., the voltage of the output signal 212) may change.

In continuing with the above example, the following relationship may be used to express a voltage output of the sensor 106 when the vehicle 102 is oriented along the second directional heading 404:

$$V_{out}=V_{bias}\times B\times\cos(\theta-\phi) \quad \text{(Eqn. \#2)}$$

where $V_{out}$ represents a voltage of the output signal 212 generated by the sensor 106, $V_{bias}$ represents the voltage that is applied as the bias current 304 (shown in FIG. 3), θ represents an angle between the first directional heading 400 of the vehicle 102 (and/or the sensor 106), and φ represents an angle between the second directional heading 404 of the vehicle 102 (and/or the sensor 106) and the field direction 402 of the external magnetic field 202. As shown in FIG. 4, the angles θ and φ differ from each other and, as a result, the output signals 212 associated with the first and second directional headings 400, 404 differ from each other.

In operation, the control unit 110 (shown in FIG. 1) can use the output signals 212 (shown in FIG. 2) generated by the magnetic sensor 106 (shown in FIG. 1) to determine which route 104 or route segment that the vehicle 102 is traveling on after the vehicle 102 passes through an intersection, or divergence, of routes 104. If the vehicle 102 is being controlled to operate according to a trip plan generated and/or modified by the energy management system 130 (shown in FIG. 1), then the vehicle 102 may need to travel on routes 104 or route segments upon which the trip plan is based in order for the vehicle 102 to reduce fuel consumed and/or emissions generated according to the trip plan. If the vehicle 102 moves to an incorrect route 104 or route segment (e.g., a route that is not included in the trip plan or that the trip plan is not based on), then the control unit 110 can notify the energy management system 130 and/or operator of the vehicle 102. The energy management system 130 may then re-plan (e.g., re-formulate or modify) the trip plan based on the new route 104 or route segment that the vehicle 102 is traveling on. Alternatively, the control unit 110 may notify the operator so that the operator can resume manual control of the vehicle 102 from the autonomous control according to the trip plan and/or manually request a re-plan of the trip plan.

Figure 5:
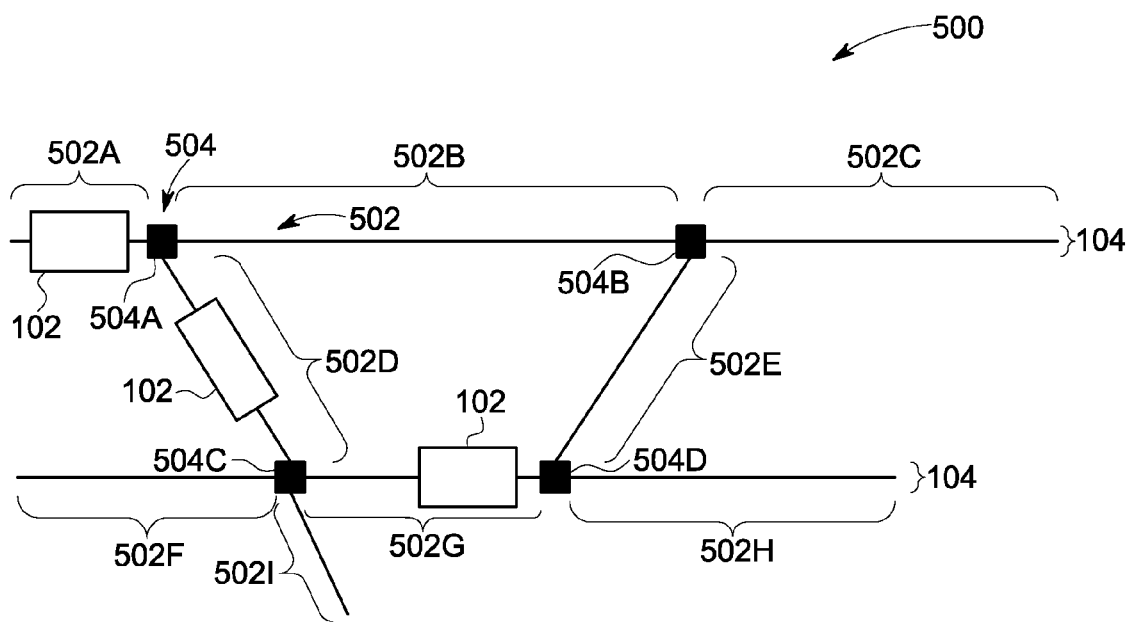
FIG. 5 illustrates an example of how the output signals from the sensor shown in FIG. 1 may be used to determine which route segments that the vehicle shown in FIG. 1 is traveling along.
Figure 6:
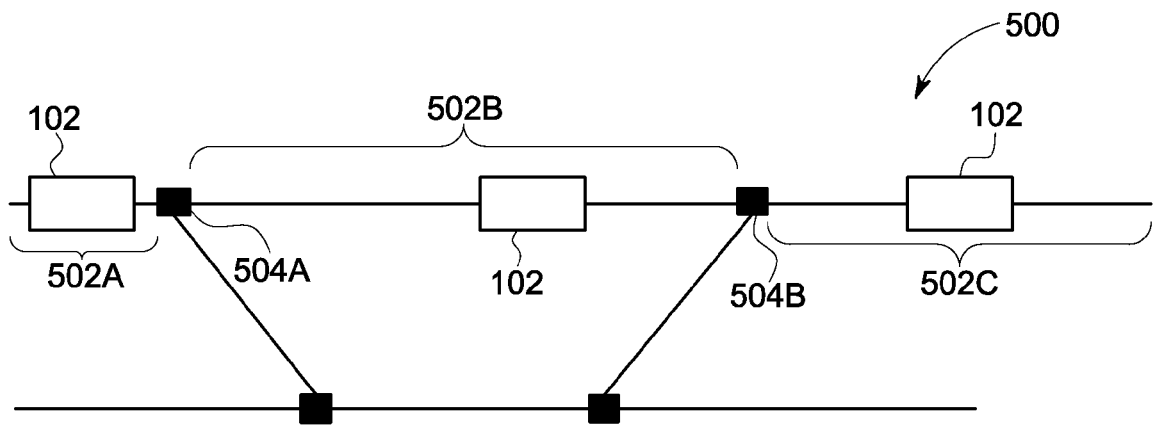
FIG. 6 illustrates another example of how the output signals from the sensor shown in FIG. 1 may be used to determine which route segments that the vehicle shown in FIG. 1 is traveling along.
Figure 7:
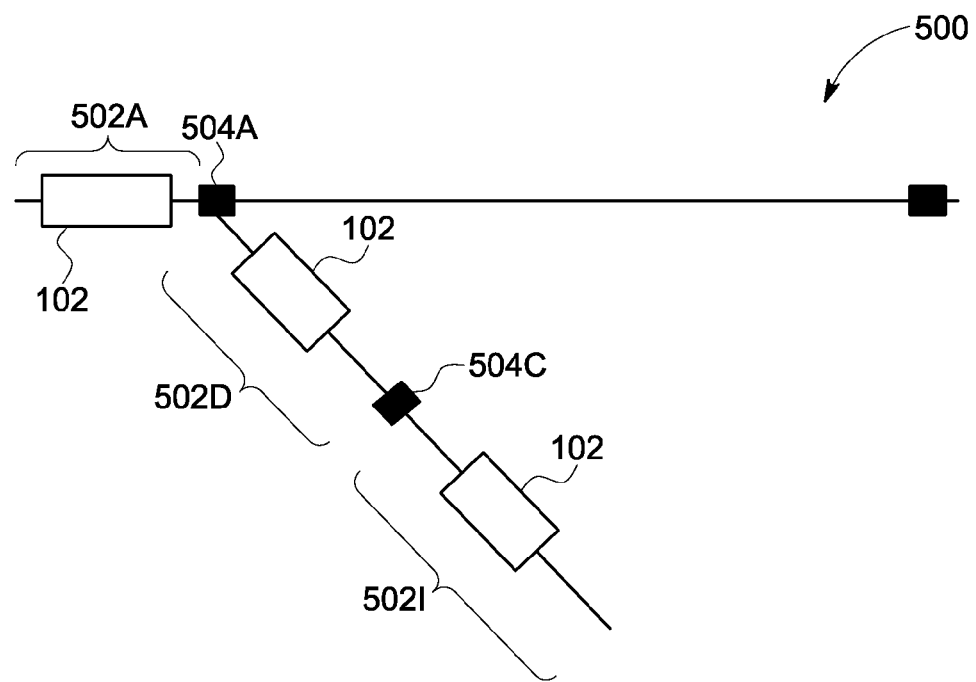
FIG. 7 illustrates an example of how the output signals from the sensor shown in FIG. 1 may be used to determine which route segments that the vehicle shown in FIG. 1 is traveling along.

FIGS. 5 through 7 include examples of how the output signals 212 from the sensor 106 (shown in FIG. 1) may be used to determine which route segments that the vehicle 102 is traveling along. FIGS. 5 through 7 illustrate the vehicle 102 traveling on different route segments 502 in a network 500 of routes 104. The route segments 502 represent portions (e.g., less than all) of a route 104 that can be taken by the vehicle 102 to travel between locations. Several intersections 504 are provided between the route segments 502. The intersections 504 represent points of divergence between the route segments 502 in the illustrated embodiment. For example, the vehicle 102 may diverge, or move in a different direction, from one route segment (e.g., route segment 502A) to another route segment (e.g., route segment 502D) when at the intersections 504. In one embodiment, the intersections 504 may represent switches between different segments of track.

In the example of FIG. 5, the vehicle 102 travels along the first route segment 502A, through the first intersection 504A and changes directional heading to travel on the fourth route segment 502D, and through the third intersection 504C to change directional heading again to travel on the seventh route segment 502G. In the example of FIG. 6, the vehicle 102 travels along the first route segment 502A, through the first intersection 504A to the second route segment 502B, and through the second intersection 504B to the third route segment 502C. The vehicle 102 does not substantially change directional heading in the example of FIG. 6, although slight misalignment between the route segments 502A, 502B, 502C may result in relatively small changes in the directional heading of the vehicle 102 as the vehicle 102 passes through the intersections 504A, 504B. In the example of FIG. 7, the vehicle 102 travels from the first route segment 502C, through the first intersection 504A to change directional heading, along the fourth route segment 502D, and through the third intersection 504C to travel along the ninth route segment 502I. The vehicle 102 does not substantially change directional heading when traveling along the fourth and ninth route segments 502D, 502I.

Because the external magnetic field 202 (shown in FIG. 2) may remain substantially constant in one embodiment, changes in the output signal 212 (shown in FIG. 2) from the sensor 106 (shown in FIG. 1) may be correlated to different directional headings of the vehicle 102 and different route segments 502. The memory unit 112 may store designated electrical characteristics of the output signal 212 (e.g., voltages, frequencies, and the like) and/or designated output signals that represent different directional headings of the vehicle 102. For example, the memory unit 112 may associate various designated output signals and/or characteristics of the output signals with different directional headings in a database, table, list, or other memory structure. Table 1 below provides one example of such a memory structure:

TABLE 1

| θ (degrees) | $V_{out}$ (millivolts) |
|---|---|
| 0 | 14.4 |
| 2.5 | 14.35 |
| 5 | 14.29 |
| 7.5 | 14.24 |
| 10 | 14.181 |
| 12.5 | 14.02 |
| 15 | 13.86 |
| 17.5 | 13.7 |
| 20 | 13.532 |
| 22.5 | 13.27 |
| 25 | 13 |
| 27.5 | 12.74 |
| 30 | 12.471 |
| 32.5 | 12.11 |
| 35 | 11.75 |
| 37.5 | 11.39 |
| 40 | 11.031 |
| 42.5 | 10.59 |
| 45 | 10.14 |
| 47.5 | 9.698 |
| 50 | 9.256 |
| 52.5 | 8.742 |
| 55 | 8.228 |
| 57.5 | 7.714 |
| 60 | 7.2 |
| 62.5 | 6.632 |
| 65 | 6.063 |
| 67.5 | 5.494 |
| 70 | 4.925 |
| 72.5 | 4.319 |
| 75 | 3.712 |
| 77.5 | 3.106 |
| 80 | 2.5 |
| 90 | 0 |

In Table 1, θ represents the angle between the directional heading of the vehicle 102 (shown in FIG. 1) and the field direction 402 (shown in FIG. 4) of the external magnetic field 202 (shown in FIG. 2), and $V_{out}$ represents the corresponding designated voltage of the output signal 212 (shown in FIG. 2). In one embodiment, θ may be limited to ninety degrees or less. For example, for directional headings of the vehicle 102 that are misaligned from the field direction 402 by more than ninety degrees, the value of θ may represent the supplementary angle to the angle between the directional heading of the vehicle 102 and the field direction 402 of the external magnetic field 202.

The designated voltages in the right column of Table 1 may be previously measured or calculated and stored in the memory unit 112 (shown in FIG. 1) to correspond with the different directional headings. Alternatively, a characteristic of the output signal 212, such as frequency, may be used. In another embodiment, ranges of voltages (or other characteristics) of the output signal 212 may be used.

The control unit 110 (shown in FIG. 1) can compare the output signal 212 (shown in FIG. 2) measured by the sensor 106 (shown in FIG. 1) with the designated output signals or designated characteristics of the output signal in the table (or other memory structure). The control unit 110 may identify which designated signal, characteristic, or range of signals or characteristics stored in the memory unit 112 match the output signal 212 (or characteristics of the output signal 212) received from the sensor 106. By "match," it is meant that the control unit 110 can determine which designated signal or characteristic is closer in value to the actual output signal 212 (or characteristic of the output signal 212) received from the sensor 106 than one or more other designated signals or characteristics, or than all other designated signals or characteristics. Alternatively, if the designated signals or characteristics are expressed in ranges, the control unit 110 may determine which range of the designated signals or characteristics includes the output signal 212 or characteristic of the output signal 212 received from the sensor 106.

Based on the designated signal or characteristic that matches the actual output signal 212 (shown in FIG. 2) or characteristic of the output signal 212, the control unit 110 (shown in FIG. 1) identifies the corresponding directional heading. With respect to the table shown above, if the output signal 212 includes a voltage of 14.38 millivolts, then the control unit 110 may determine that the vehicle 102 (shown in FIG. 1) has a directional heading of zero degrees (or another directional heading), such as a directional heading that is aligned with or is relatively closely aligned with the field direction 402 (shown in FIG. 4) of the external magnetic field 202 (shown in FIG. 2). As another example, if the output signal 212 includes a voltage of 12.5 millivolts, then the control unit 110 may determine that the vehicle 102 has a directional heading of thirty degrees or 120 degrees from the field direction 402.

In one embodiment, the control unit 110 (shown in FIG. 1) can refer to the memory unit 112 (shown in FIG. 1) to identify the directional heading of the vehicle 102 (shown in FIG. 1) periodically, when prompted by an operator of the vehicle 102, and/or when the output signals 212 (shown in FIG. 2) from the sensor 106 (shown in FIG. 1) change by at least a designated threshold, such as a non-zero threshold. Alternatively or additionally, the control unit 110 can identify the directional heading of the vehicle 102 when the vehicle 102 approaches, passes over, or passes an intersection 504. For example, the location determining system 126 (shown in FIG. 1) may repeatedly determine geographic locations of the vehicle 102. The control unit 110 can monitor the geographic locations of the vehicle 102 and, based on the known or designated route that the vehicle 102 is following (e.g., which may be stored in the memory unit 112 shown in FIG. 1 along with associated landmarks, such as intersections 504), the control unit 110 can determine when the vehicle 102 approaches, passes over, and/or passes through an intersection 504. The control unit 110 may then examine the output signals 212 from the sensor 106 to determine the directional heading of the vehicle 102.

Once the directional heading of the vehicle 102 (shown in FIG. 1) is determined, the control unit 110 (shown in FIG. 1) can identify which route segment 502 that the vehicle 102 is traveling along. In one embodiment, the route segments 502 that meet at an intersection 504 may be associated with different directional headings. For example, the memory unit 112 (shown in FIG. 1) may include a table, list, database, or other memory structure that associates different routes or route segments 502 of an intersection 504 (e.g., that meet at or diverge from the intersection 504) with different directional headings. This memory structure may be used by the control unit 110 to determine or verify which route segment 502 the vehicle 102 is traveling along after passing through the intersection 504. Table 2 below provides one example of such a memory structure:

TABLE 2

| Intersection (ID) | Arrival Route Segment (ID) | Current Directional Heading (degrees) | Current Route Segment (ID) |
|---|---|---|---|
| 504A | 502A | 5 or 175 | 502B |
| 504A | 502A | 2.5 or 177.5 | 502D |
| 504A | 502B | 5 or 175 | 502A |
| 504A | 502B | 2.5 or 177.5 | 502D |
| 504A | 502D | 5 or 175 | 502A or 502B |

In Table 2, "Intersection" indicates the intersection by an identifier, "Arrival Route Segment" indicates which route segment 502 that the vehicle 102 (shown in FIG. 1) traveled along to reach the intersection 504, "Current Directional Heading" indicates the direction in which the vehicle 102 is traveling after passing through the intersection 504, and "Current Route Segment" indicates which route segment 502 that the vehicle 102 is traveling along after passing through the intersection 504. While Table 2 only shows the data for the first intersection 504A, alternatively, Table 2 (or other memory structure used by the control unit 110 shown in FIG. 1) could list additional intersections.

The control unit 110 (shown in FIG. 1) can determine which intersection 504 that the vehicle 102 (shown in FIG. 1) is approaching based on a measured location of the vehicle 102 as obtained by the location determining system 126 (shown in FIG. 1) or by another technique, such as by knowing an expected time of arrival at the intersection 504 based on a known layout of the route segments 502 and intersections 504, a known path that the vehicle 102 is scheduled to travel along, and/or a scheduled time that the vehicle 102 is to arrive at the intersection 504. Once the control unit 110 (shown in FIG. 1) identifies the directional heading of the vehicle 102 (shown in FIG. 1), the control unit 110 can refer to the table (or other memory structure) to use the directional heading and determine which route segment 504 that the vehicle 102 is traveling along. For example, if the vehicle 102 is traveling through the first intersection 504A from the first route segment 502A, and the identified directional heading (based on the output signals 212 shown in FIG. 2) is 5 or 175 degrees, then the control unit 110 may determine that the vehicle 102 is traveling on the second route segment 502B. As another example, if the vehicle 102 is traveling through the first intersection 504A from the second route segment 502B, and the identified directional heading is 2.5 or 177.5 degrees, then the control unit 110 may determine that the vehicle 102 is traveling on the fourth route segment 502D. In another example, if the vehicle 102 is traveling through the first intersection 504A from the fourth route segment 502D, and the identified directional heading is 5 or 175 degrees, then the control unit 110 may determine that the vehicle 102 is traveling on the first or second route segment 502A, 502B. The control unit 110 may be unable to distinguish between the first or second route segment 502A, 502B based on the directional heading alone if the first and second route segments 502A, 502B are collinear. In one embodiment, the control unit 110 can obtain a sensed location of the vehicle 102 from the location determining system 126 in order to determine if the vehicle 102 is on the first or second route segment 502A, 502B.

In another embodiment, the memory structure that associates the directional headings of the vehicle 102 (shown in FIG. 1) with the route segments 502 (e.g., Table 2) may instead or additionally associate the output signals 212 (shown in FIG. 2) and/or characteristics of the output signals 212 with the route segments 502. For example, the control unit 110 (shown in FIG. 1) may use the output signals 212 from the sensor 106 (shown in FIG. 1) to both determine the directional heading and the route segment 502 that the vehicle 102 is traveling along using the same memory structure.

In another aspect, in addition to or in place of using the output signals 212 (shown in FIG. 2) to determine the directional heading of the vehicle 102 (shown in FIG. 1) and/or the route segment 502 on which the vehicle 102 is traveling, the control unit 110 (shown in FIG. 1) may periodically obtain sensed locations of the vehicle 102 from the location determining system 126 (shown in FIG. 1). For example, prior to arriving at an intersection 504, the control unit 110 may obtain a geographic location of the vehicle 102 from the location determining system 126. Once the vehicle 102 passes through the intersection 504, the control unit 110 may obtain a geographic location of the vehicle 102. The control unit 110 may use this geographic location to determine which route segment 502 of the route segments 502 that meet at the intersection 504 that the vehicle 102 is traveling along.

As described above, the energy management system 130 (shown in FIG. 1) of the system 100 (shown in FIG. 1) may generate a trip plan for the vehicle 102 (shown in FIG. 1) that designates operational settings of the vehicle 102, and may designate which route segments 502 that the vehicle 102 is to travel along, in order to reduce fuel consumed and/or emissions generated by the vehicle 102. The control unit 110 (shown in FIG. 1) and/or energy management system 130 may monitor actual movement of the vehicle 102 during the trip, such as by using sensed locations from the location determining system 126 (shown in FIG. 1), output signals 212 (shown in FIG. 2) from the sensor 106 (shown in FIG. 1), and/or other data. In one embodiment, when the control unit 110 and/or energy management system 130 determines that the vehicle 102 is approaching or passes through an intersection 504 (such as where the vehicle 102 may move to one of plural divergent route segments 502), the control unit 110 and/or energy management unit 130 may determine which route segment 502 that the vehicle 102 is traveling on, as described above. The vehicle 102 may not remain on the route segments 502 designated by the trip plans for a variety of reasons, such as a changed signal and/or occupancy status of the designated route segment 502, damage to the designated route segment 502, operator error, and the like. If the control unit 110 determines that the vehicle 102 has moved to a route segment 502 that is not included in the trip plan, then the control unit 110 may report this divergence to the energy management system 130. The energy management system 130 may then re-plan (e.g., modify) the trip plan to account for the vehicle 102 taking a different path that previously planned. For example, the energy management system 130 may generate a new trip plan that includes the vehicle 102 traveling along the current route segment 502 and one or more other route segments 502 that are connected with the current route segment 502 but that may not have been available to travel along according to the previous trip plan.

In one embodiment, the control unit 110 (shown in FIG. 1) can differentiate between curvature of a route segment 502 and a change in the directional heading of the vehicle 102 (shown in FIG. 1) by using known locations of the route segments 502. For example, when the control unit 110 identifies a change in directional heading based on the output signals 212 (shown in FIG. 2) from the sensor 106 (shown in FIG. 1), the control unit 110 may examine the known orientations and/or layouts (e.g., curvature and/or linear shape) of the route segments 502 at an intersection 504 relative to each other (e.g., relative angular orientations). The known orientations of the route segments 502 may be stored in the memory unit 112 (shown in FIG. 1). The control unit 110 may be able to compare the directional heading with the orientations and/or layouts of the route segments 502 to determine if the vehicle 102 is merely traveling along a curved route segment 502 and/or has changed which route segment 502 that the vehicle 102 is traveling along.

In another aspect, the system 100 (shown in FIG. 1) may be used to provide sensed locations of the vehicle 102 (shown in FIG. 1) in areas where the location determining system 126 (shown in FIG. 1) may be unable to determine the location of the vehicle 102. For example, if the vehicle 102 travels into a covered tunnel (e.g., a route having an overhead ceiling, such as a ceiling made of earth, rock, water in the case of underwater tunnels, metal, or other overhead structure), then the location determining system 126 may be unable to communicate with remote data sources (e.g., satellites of a global positioning system) that provide data for determining the location of the vehicle 102. As another example, adverse weather conditions (e.g., dense overhead cloud coverage or fog) may prevent the location determining system 126 from identifying the location of the vehicle 102.

The control unit 110 (shown in FIG. 1) may use the known layout of routes 104 (shown in FIG. 1) with the directional headings based on the output signals 212 (shown in FIG. 2) from the sensor 106 (shown in FIG. 1) to determine the geographic location of the vehicle 102 (shown in FIG. 1). When the vehicle 102 travels into an area where the location determining system 126 cannot identify the geographic location of the vehicle 102, the control unit 110 may monitor the output signals 212 from the sensor 106 to determine the directional heading of the vehicle 102. The control unit 110 may compare the directional heading to the known layout (e.g., position, orientation, and/or curvature) of the route 104 to determine the position of the vehicle 102 on the route 104. For example, different portions of the route 104 may be associated with different directional headings of vehicles 102 that travel on those portions of the route 104. These associated directional headings may be compared to the identified directional heading that is based on the output signals 212 so that the control unit 110 can determine where the vehicle 102 is on the route 104. In one embodiment, the different portions of the route 104 can be associated with geographic locations or ranges of geographic locations in a memory structure of the memory unit 112 so that the control unit 110 can determine the geographic location of the vehicle 102.

In another aspect, the system 100 (shown in FIG. 1) may use the output signals 212 (shown in FIG. 2) from the sensor 106 (shown in FIG. 1) to verify which route segment 502 that the vehicle 102 (shown in FIG. 1) is traveling along. For example, with respect to rail vehicles operating in a positive train control (PTC) configuration that limits where and/or when the vehicles can travel, such as in a rail yard, the control unit 110 (shown in FIG. 1) can determine the directional heading of the vehicle and which segment of track that the vehicle is traveling along. This information can be compared to similar information provided wirelessly from wayside equipment or through a wired connection with the rails of the track (e.g., by communicating signals through the rails) in order to verify the information. If the identification of a track segment that is provided by wayside equipment and/or through the rails of the track does not correspond to the identification of the track segment that is based on the output signals 212, then the control unit 110 can communicate an alarm signal to the operator of the vehicle and/or to an off-board location to warn others of the mismatch in information. Verifying the location of the vehicle and issuing alarms when the vehicle is on a different track segment than expected can be used with anti-collision systems that detect locations of vehicles and prevent the vehicles from colliding with each other.

Figure 8:
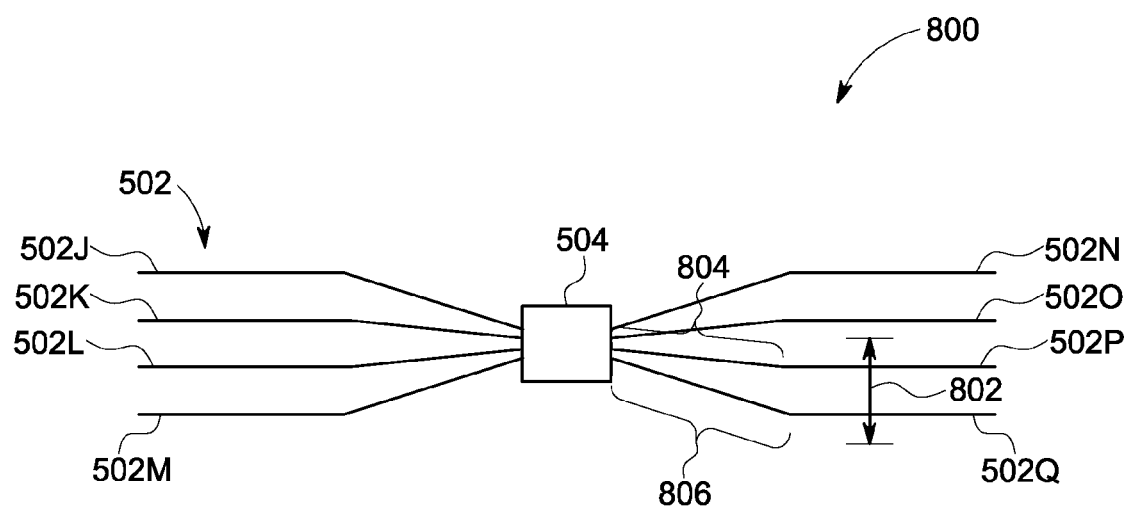
FIG. 8 illustrates another portion of a network of route segments in accordance with another example.

FIG. 8 illustrates another portion of a network 800 of route segments 502 in accordance with another example. The control unit 110 (shown in FIG. 1) can use the output signals 212 (shown in FIG. 2) from the sensor 106 (shown in FIG. 1) to determine which of several relatively closely spaced route segments 502 that the vehicle 102 (shown in FIG. 1) is traveling along. For example, when the vehicle 102 moves through an intersection 504 from one route segment 502J-502M or 502N-502Q to another route segment 502N-502Q or 502J-502M, the location determining system 126 (shown in FIG. 1) may be unable to determine which route segment 502J-Q that the vehicle 102 is traveling along if the route segments are spaced too close together.

The location determining system 126 (shown in FIG. 1) may have a measurement ambiguity 802 limits the resolution of the system 126. The measurement ambiguity 802 represents a minimum distance that the system 126 can distinguish between two different locations or coordinates. For example, the location determining system 126 may be unable to distinguish between different locations of the vehicle 102 that are within the measurement ambiguity 802 of the system 126. If the route segments 502 are spaced closer together than the measurement ambiguity 802 (as in rail yards, lanes of a multi-lane road or highway, and the like), then the system 126 may be unable to determine if the vehicle 102 (shown in FIG. 1) is on the route segments 502 located within the measurement ambiguity 802. With respect to the illustrated example, the system 126 may be unable to determine if the vehicle 102 is on the route segment 502P or 502Q. For example, the measurement ambiguity 802 may be at least 6.6 to 9.8 feet (or two to three meters), and the route segments 502 may be located closer together than (e.g., have a pitch that is less than) 6.6 to 9.8 feet (or two to three meters). Alternatively, the measurement ambiguity 802 may be a larger distance.

The control unit 110 (shown in FIG. 1), however, may be able to use the different relative orientations of the route segments 502P or 502Q to determine where the vehicle 102 is traveling. As described above and shown in FIG. 8, portions 804, 806 of the route segments 502P, 502Q may have different angular orientations with respect to each other. These portions 804, 806 may be associated with different directional headings of the vehicle 102 in a memory structure of the memory unit 112 (shown in FIG. 1). The control unit 110 can use the directional heading determined from the output signals 212 (shown in FIG. 2) to determine which route segment 502P, 502Q that the vehicle 102 is traveling along.

Figure 9:
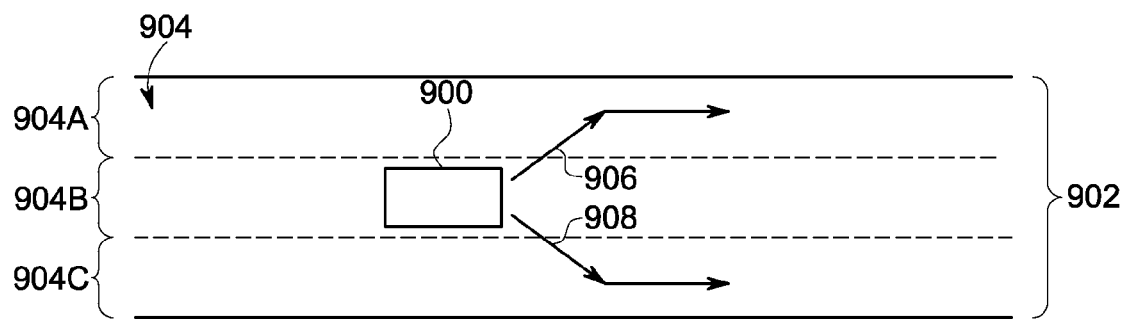
FIG. 9 illustrates a vehicle traveling along a multi-lane road in accordance with another example.

FIG. 9 illustrates a vehicle 900 traveling along a multi-lane road 902 in accordance with another example. The vehicle 900 may include at least some of the same components of the system 100 (shown in FIG. 1), such as the control unit 110, the memory unit 112, the sensor 106, and/or the location determining system 126. In one embodiment, the vehicle 900 is an automobile traveling in one lane 904 of a multi-lane road 902. Similar to the example described above in connection with FIG. 8, the location determining system 126 of the vehicle 900 may have a measurement ambiguity that is sufficiently large that the location determining system 126 is unable to determine which lane the vehicle 900 is traveling in.

The control unit 110 (shown in FIG. 1) of the vehicle 900 may monitor the output signals 212 (shown in FIG. 2) from the sensor 106 (shown in FIG. 1) to determine if the vehicle 900 changes lanes 904 and/or which lane 904 the vehicle 900 travels to. For example, the control unit 110 may track the output signals 212 over time and, if the output signals 212 remain substantially constant (e.g., remain within a designated range), then the control unit 110 may determine that the vehicle 900 is traveling in a single, linear lane 904. If the output signals 212 change, the control unit 110 may determine if the vehicle 900 is moving from a second lane 904B in a first directional heading 906 to a first lane 904A or in a second directional heading 908 to a third lane 904C. The direction and/or amount of change in the output signals 212 may indicate whether the vehicle 110 is moving in the first directional heading 906 or the second directional heading 908. For example, if the output signals 212 increase, then the control unit 110 may determine that the vehicle 900 is moving in the second directional heading 908 while, if the output signals 212 decrease, then the control unit 110 may determine that the vehicle 900 is moving in the first directional heading 906.

Figure 10:
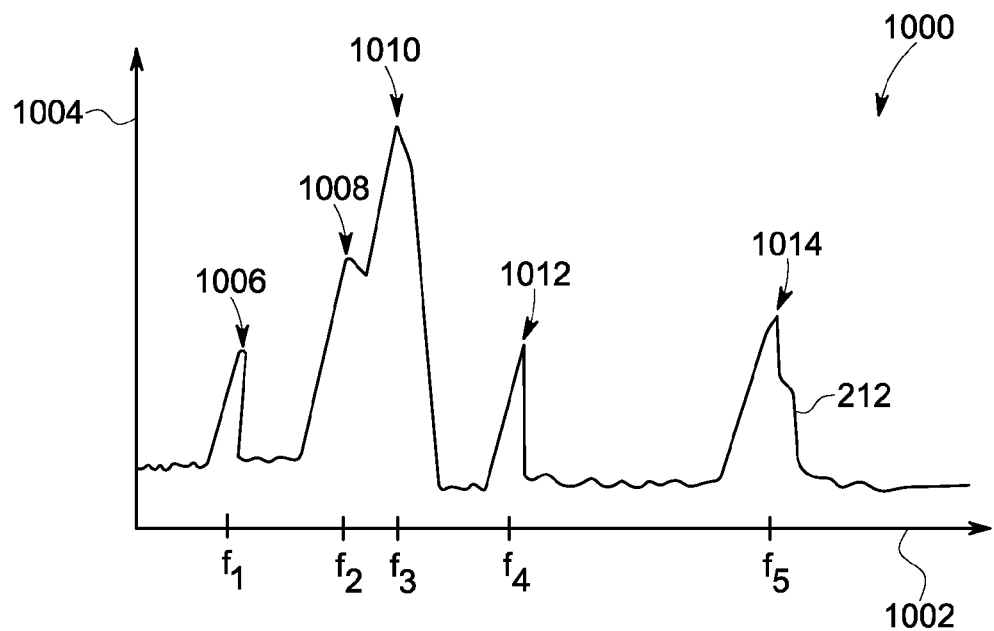
FIG. 10 illustrates a frequency domain representation of output signals generated by the sensor shown in FIG. 1 in accordance with one example.

FIG. 10 illustrates a frequency domain representation 1000 of output signals 212 generated by the sensor 106 (shown in FIG. 1) in accordance with one example. The output signals 212 are shown alongside a horizontal axis 1002 representative of frequency and a vertical axis 1004 representative of magnitude. The control unit 110 (shown in FIG. 1) may monitor the output signals 212 and generate the representation 1000 to identify peaks 1006, 1008, 1010, 1012, 1014, such as portions of the representation 1000 that have greater magnitudes than other portions of the representation 1000. In one embodiment, the control unit 110 can compare the frequencies $f_1$, $f_2$, $f_3$, $f_4$, $f_5$ at which one or more of the peaks 1006, 1008, 1010, 1012, 1014 occur with one or more designated frequencies (e.g., stored in the memory unit 112 shown in FIG. 1) to determine if one or more of the frequencies $f_1$, $f_2$, $f_3$, $f_4$, $f_5$ occur at or near (e.g., within a designated range) of the designated frequencies. The designated frequencies can be associated with output signals 212 generated by mechanical vibrations caused by travel of the vehicle 102 (shown in FIG. 1) along the route 104 (shown in FIG. 1). If one or more of the frequencies $f_1$, $f_2$, $f_3$, $f_4$, $f_5$ at which one or more of the peaks 1006, 1008, 1010, 1012, 1014 occur do not occur at or near the designated frequencies, then the frequencies $f_1$, $f_2$, $f_3$, $f_4$, $f_5$ at which one or more of the peaks 1006, 1008, 1010, 1012, 1014 occur may represent mechanical damage to the vehicle 102 (e.g., to a suspension system of the vehicle 102) and/or to the route 104. The control unit 110 may communicate an alarm signal to the operator of the vehicle 102 (e.g., via the output device 132 shown in FIG. 1) and/or to an off-board location, such as a repair facility that the vehicle 102 is heading toward. The repair facility can then arrange or schedule the repair of the vehicle 102 before the vehicle 102 arrives.

Alternatively or additionally, the signals 212 generated by the sensor 106 may be monitored to control or change vehicle handing as the vehicle 102 is traveling along the route. For example, the vibrations of the vehicle 102 may be monitored based on the signals 212 and/or frequencies of the signals 212. The signals 212 can be examined by the control unit 110 to determine if one or more waveforms (e.g., peaks 1006, 1008, 1010, 1012, 1014) of the signals 212 have at least a designated magnitude or amplitude at one or more designated frequencies. If such waveforms are identified (referred to as waveforms of interest), then the control unit 110 may change how the control unit 110 controls operations of the vehicle 102. For example, the control unit 110 may decrease speed, transmit a signal to an off-board location to schedule maintenance (as described above), and the like, in order to avoid or reduce damage to the vehicle 102 that may be caused by continued vibrations or other movement of the vehicle 102 that are represented by the waveforms of interest.

Figure 11:
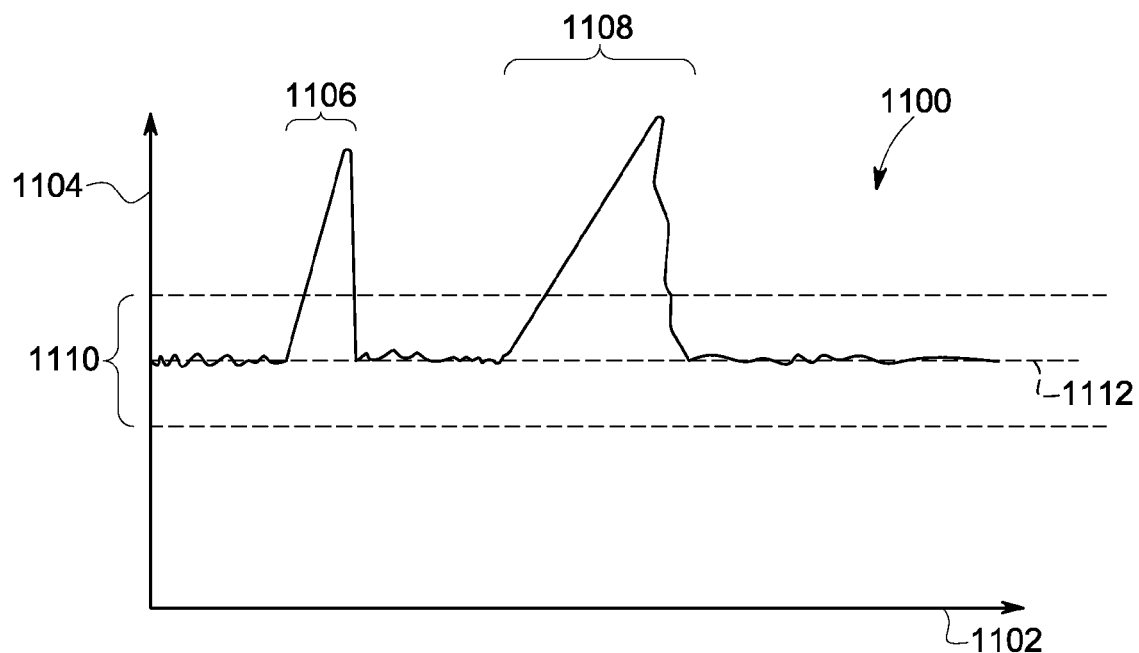
FIG. 11 illustrates a time domain representation of output signals generated by the sensor shown in FIG. 1 in accordance with one example.

FIG. 11 illustrates a time domain representation 1100 of output signals 212 generated by the sensor 106 (shown in FIG. 1) in accordance with one example. The output signals 212 are shown alongside a horizontal axis 1102 representative of time and a vertical axis 1104 representative of a characteristic of the output signals 212 (e.g., voltage). The control unit 110 (shown in FIG. 1) may monitor the output signals 212 and generate the representation 1100 to identify deviations 1106, 1108 (e.g., waveforms) in the output signals 212, such as portions of the representation 1100 that have greater magnitudes than other portions of the representation 1100. In one embodiment, the control unit 110 can monitor the output signals 212 when the vehicle 102 is keeping a constant or relatively constant (e.g., stays within a designated range) directional heading. The control unit 110 can examine the output signals 212 to determine if any deviations 1106, 1108 occur by identifying where the output signals 212 extend outside of a range 1110 of output signals 212 on one or more sides of a baseline output signal 1112. The baseline output signal 1112 can represent the output signals 212 that were previously measured or expected to occur when the sensor 106 is oriented at a designated angle to the external magnetic field 202 (shown in FIG. 1). The deviations 1106, 1108 can represent output signals 212 from the sensor 106 that are generated due to incorrect readings from the sensor 106, damage to the sensor 106, mechanical vibrations of the sensor 106, and the like. For example, the deviations 1106, 1108 may indicate a fault or failure in the sensor 106 and/or vehicle 102. When one or more deviations 1106, 1108 are detected, the control unit 110 may communicate an alarm signal to the operator of the vehicle 102 (e.g., via the output device 132 shown in FIG. 1) and/or to an off-board location, such as a repair facility that the vehicle 102 is heading toward. The repair facility can then arrange or schedule the repair of the vehicle 102 before the vehicle 102 arrives.

Figure 12:
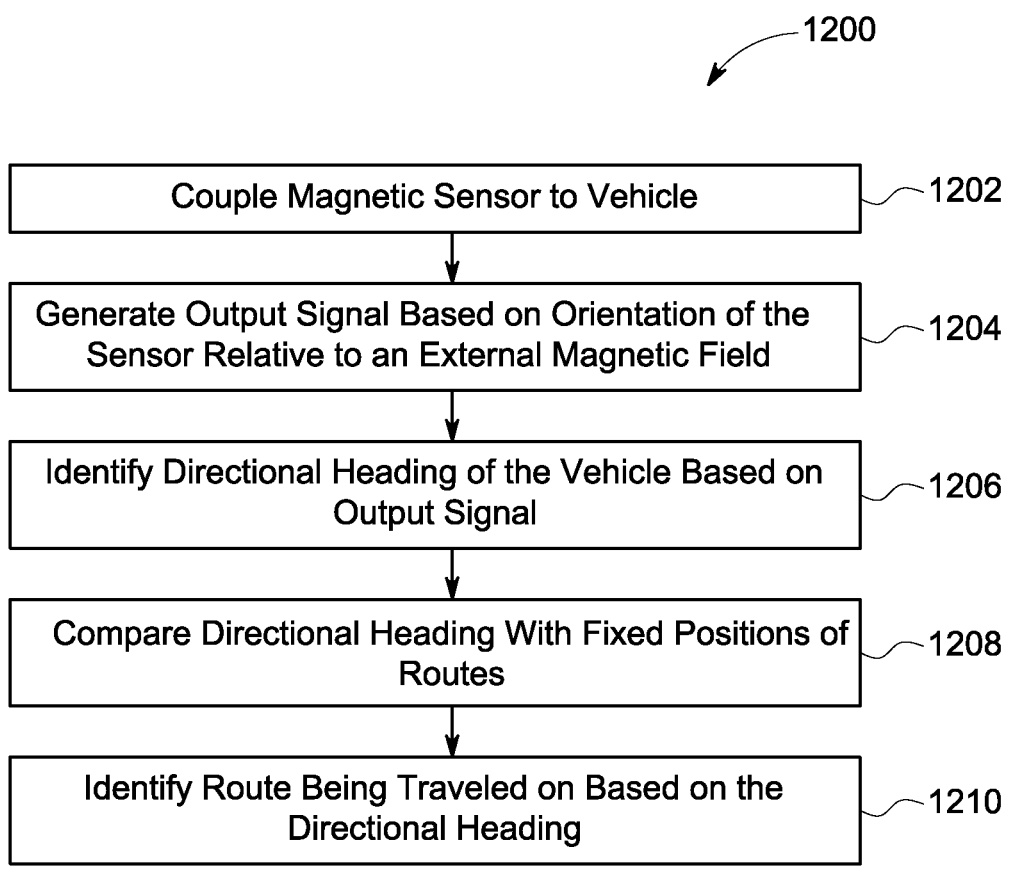
FIG. 12 is a flowchart of one embodiment of a method for identifying a directional heading of a vehicle.

FIG. 12 is a flowchart of one embodiment of a method 1200 for identifying a directional heading of a vehicle. The method 1200 may be used in conjunction with one or more embodiments of the system 100 (shown in FIG. 1). For example, the method 1200 may be used to determine a directional heading of the vehicle 102 (shown in FIG. 1) and, based on the directional heading, identify which of plural routes or route segments that the vehicle 102 is traveling along.

At 1202, a magnetic sensor is coupled to a vehicle. For example, the sensor 106 (shown in FIG. 1) may be affixed to an exterior surface of the vehicle 102 (shown in FIG. 1). The sensor 106 may be positioned outside of the vehicle 102 (as opposed to being carried by an operator inside the vehicle 102 or otherwise disposed within the vehicle 102) in order to reduce electromagnetic interference in the vehicle 102 and/or electromagnetic shielding of the sensor 106. Alternatively, the sensor 106 may be joined to the vehicle 102 in another location.

At 1204, an output signal is generated by the sensor. The output signal is based on an orientation of the sensor relative to an external magnetic field. For example, the sensor 106 (shown in FIG. 1) can generate a voltage signal that represents the orientation of the sensor 106 and vehicle 102 (shown in FIG. 1) relative to the earth's magnetic field.

At 1206, a directional heading of the vehicle is identified based on the output signal from the sensor. For example, the direction in which the vehicle 102 (shown in FIG. 1) is oriented or moving may be determine based on the voltage of the output signal 212 (shown in FIG. 2). In one embodiment, the directional heading is determined by comparing the output signal 212 to one or more designated output signals that are associated with different directional headings, as described above.

At 1208, the directional heading is compared with positions of routes. For example, the directional heading that is determined from the output signal 212 (shown in FIG. 2) may be compared to the fixed layout (e.g., angular orientation and/or relative positions) of the route segments that the vehicle 102 (shown in FIG. 1) may travel along. The directional heading may more closely match (e.g., be more closely aligned with) one of the routes or route segments than one or more, or all, of the other routes or route segments.

At 1210, the route or route segment having an orientation or position that more closely matches the directional heading is identified as the route or route segment that the vehicle is traveling along, as described above.

In one embodiment, the sensor 106 (shown in FIG. 1) may be used to determine which track or section of track that a rail vehicle (e.g., the vehicle 102 shown in FIG. 1) is traveling on when the vehicle 102 is traveling on a first track of several tracks that are oriented along non-intersecting paths (e.g., the tracks are disposed parallel or substantially parallel, such as by being more parallel to each other than not parallel). For example, in some rail yards, several sections of track may be disposed parallel to each other with some of the sections of track being connected by angled track sections (e.g., sections of track that are disposed at an angle and coupled to two or more other sections of track). The parallel sections of track may be relatively close together, such as by being located fourteen feet apart from each other (or some other distance).

When the vehicle 102 (shown in FIG. 1) approaches an intersection between two or more sections of track (which may be determined based on the location determination system 126 shown in FIG. 1), the control unit 110 (shown in FIG. 1) can prompt the operator of the vehicle 102 to provide input that represents which section of track that the vehicle 102 will travel along after traveling through the intersection. For example, with respect to the example shown in FIG. 5, when the vehicle 102 is traveling along the route segment 502A toward the intersection 504A, the control unit 110 may present instructions to the operator through the output device 132 (shown in FIG. 1) of the vehicle 102. These instructions can direct the operator to input into the control unit 110 (such as by using one or more input devices onboard the vehicle 102 such as a keyboard, stylus, touchscreen, keypad, microphone, and the like) whether the vehicle 102 will travel on the route segment 502B or the route segment 502D after traveling through the intersection 504A. This input may be represent a designated, selected, or chosen direction or route segment on which the vehicle 102 is traveling or will travel. The route segment that the vehicle 102 is to travel on may be based on a previously established schedule or trip plan of the vehicle 102. The operator may be prompted to input which route segment that the vehicle 102 is or will travel on after passing through the intersection. The control unit 110 can verify which route segment that the vehicle 102 actually travels on in order to determine if the operator is controlling the vehicle 102 to travel on the route segments of the trip plan or on other route segments. If the vehicle 102 travels on route segments other than those of the trip plan, the trip plan can be modified to account for the vehicle 102 being on a different route segment.

After the vehicle 102 travels through the intersection 504A, the control unit 110 may examine the signals generated by the sensor 106 to determine if the signals represent a directional heading that corresponds with the designated direction or route segment (e.g., the route segment selected by the operator and/or designated for travel by a trip plan). For example, if the designated route segment is the route segment 502D, then the control unit 110 may examine the signals generated by the sensor 106 to determine if the signals indicate that the directional heading of the vehicle 102 has changed from a heading along the route segment 502A to a heading along the route segment 502D. If the signals do not confirm that the vehicle 102 is traveling along the designated route segment, then one or more operational settings of the vehicle 102 may be modified, such as the trip plan being used by the vehicle 102, as described above. In one embodiment, the control unit 110 may only examine the signals from the sensor 106 when the vehicle 102 travels through a location of interest, such as an intersection 504. Alternatively, the control unit 110 may periodically examine the signals and/or examine the signals when prompted by the operator or other system of the vehicle 102.

The control unit 110 may examine the change in angular headings of the vehicle 102 based on the signals generated by the sensor 106. For example, instead of or in addition to correlating the signals generated by the sensor 106 to different route segments 502 as described above, the control unit 110 may examine changes in the angular heading of the vehicle 102 over relatively short time periods. The time periods may include the time over which the vehicle 102 passes through the intersection and travels sufficiently far along a route segment for the signals generated by the sensor 106 to indicate the directional heading of the vehicle 102. The time periods may be based on the speed of the vehicle 102. For example, for faster speeds, the time periods may decrease and, for slower speeds, the time periods may increase.

The control unit 110 may examine the signals generated by the sensor 106 at rates or times based on the speed of the vehicle 102 and/or a known layout of the route segments 502. For example, the control unit 110 may include or be coupled with one or more speed sensors and/or determine the speed of the vehicle 102 from two or more measurements by the location determination system 126. Using the known layout or map of the intersections and route segments, the control unit 110 may use the speed of the vehicle 102 to determine when to examine the signals from the sensor 106. With respect to the example of FIG. 5, if the vehicle 102 is traveling from the third intersection 504C to the fourth intersection 504D along the route segment 502G, then the control unit 110 may use the measured speed of the vehicle 102 along with a known or calculated distance between the known or designated locations of the intersections 504C, 504D to determine when to examine the signals from the sensor 106. The control unit 110 may then examine the signals when the vehicle 102 is at or through the fourth intersection 504D.

In one embodiment, the control unit 110 may examine the signals generated by the sensor 106 at a relatively fast rate. For example, the control unit 110 may be capable of examining the signals from the sensor 106 at a rate that is faster than a GPS receiver can determine locations, such as a rate that is faster than once per second.

In addition to or as an alternative to using data from the magnetic sensor 106 as variously described above, the control unit 110 may use a measured heading that is provided by the location determining system 126 to determine which route 104 or route segment that the vehicle 102 is traveling along when the vehicle 102 passes through an intersection. As described above, the location determining system 126 may include a receiver and associated circuitry of a GPS. The data that is output by the location determining system 126 can include a directional heading of the vehicle 102. For example, the location determining system 126 may output heading data that represents an angle between the direction in which the vehicle 102 is moving and a designated direction, such as true geometric north of the earth. In one embodiment, the heading data is an angular direction or vector of travel, and is not a coordinate or position of the vehicle 102. The heading data can be communicated to the control unit 110, which then converts the heading data into the heading of the vehicle 102. For example, the orientation module 116 of the control unit 110 can convert the heading data into a measured heading of the vehicle 102. Alternatively, the location determining system 126 outputs the measured heading of the vehicle 102 to the control unit 110. In one embodiment, the heading data may be converted from a heading relative to a first designated direction (such as true north) to a heading relative to a different, second designated direction (such as a direction selected by the operator of the vehicle 102, the owner of the vehicle 102, or another entity).

The location determining system 126 also may output location data that represents coordinates of where the vehicle 102 is located, such as a measurement of the longitude and latitude of the vehicle 102. This location data may be communicated to the control unit 110, which can then convert the location data into a longitude and latitude of the vehicle 102. Alternatively, the location determining system 126 can output the longitude and latitude of the vehicle 102 to the control unit 110. As described above, the location of the vehicle 102 as determined by the location determining system 126 may be referred to as the sensed location of the vehicle 102.

In one embodiment, the control unit 110 uses the heading of the vehicle 102 to determine which route or route segment that the vehicle 102 is traveling along after passing through an intersection. The identification module 118 of the control unit 110 can receive the measured heading (as determined from data obtained by the location determining system 126) to identify which route 104 or segment of a route 104 that the vehicle 102 is traveling along. If the vehicle 102 is being controlled to operate according to a trip plan from the energy management system 130, then the vehicle 102 may need to travel on routes 104 or route segments upon which the trip plan is based in order for the vehicle 102 to reduce fuel consumed and/or emissions generated according to the trip plan. If the vehicle 102 moves to an incorrect route 104 or route segment, then the control unit 110 can notify the energy management system 130 and/or operator of the vehicle 102. The energy management system 130 may then re-plan the trip plan based on the new route 104 or route segment that the vehicle 102 is traveling on. Alternatively, the control unit 110 may notify the operator so that the operator can resume manual control of the vehicle 102 from the autonomous control according to the trip plan and/or manually request a re-plan of the trip plan.

Figure 13:
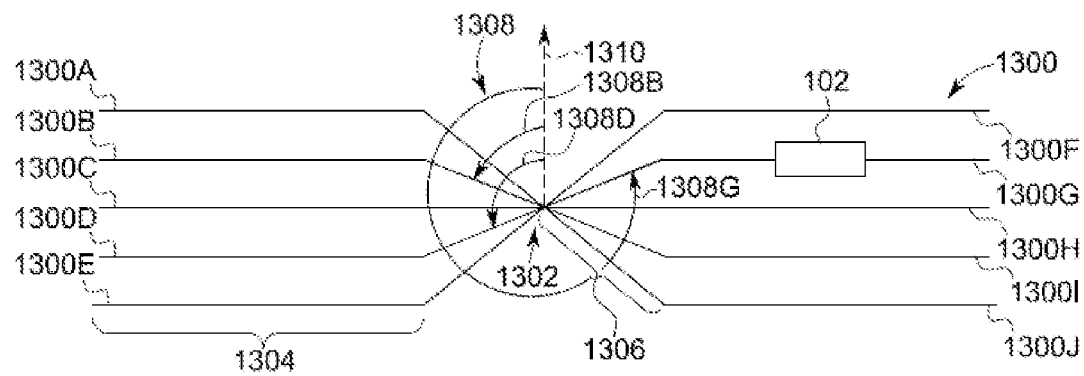
FIG. 13 is a schematic diagram of one example of several route segments meeting at an intersection.

FIG. 13 is a schematic diagram of one example of several route segments 1300 meeting at an intersection 1302. In the illustrated example, the route segments 1300 (e.g., route segments 1300A-J) include non-intersecting portions 1304 and angled portions 1306. The angled portions 1306 meet within the intersection 1302 and extend toward respective non-intersecting portions 1304. The angled portions 1306 may be obliquely and/or perpendicularly oriented relative to one another such that the angled portions 1306 are not parallel to each other. The non-intersecting portions 1304 may be elongated sections of the route segments 1300 that are parallel or substantially parallel to each other such that the non-intersecting portions 1304 are oriented along non-intersecting paths. Additional sections of the route segments 1300 that are joined to the non-intersecting portions 1304 may or may not be parallel to each other. In one embodiment, the route segments 1300 and intersection 1302 shown in FIG. 13 may represent a section in a vehicle yard, such as a rail yard.

The measured headings of the vehicle 102 may be measured by the location determining system 126 as the vehicle 102 approaches the intersection 1302, moves through the intersection 1302, and/or exits the intersection 1302. For example, the intersection 1302 may be associated with a first designated distance, such as several feet, meters, or the like, of the actual meeting location of the route segments 1300. Travel of the vehicle 102 within this designated distance can be referred to as travel within, over, or through the intersection 1302. When the vehicle 102 is moving toward the intersection 1302 and comes to within another, larger second designated distance of the actual meeting location of the route segments 1300, the vehicle 102 may be referred to as approaching the intersection 1302. When the vehicle 102 travels over, within, or through the intersection 1302 and then travels away from the intersection 1302, the vehicle 102 is referred to as exiting or leaving the intersection.

In one embodiment, the angled portions 1306 are associated (e.g., in the memory unit 112 of the vehicle 102) with different designated headings. For example, the angled portion 1306 of the route segment 1300G may be associated with a first designated heading relative to a designated direction 1310, such as true geometric north of the earth. The first designated heading may be expressed as an angular difference 1308 (e.g., angular difference 1308G) between the designated heading of the angled portion 1306 of the route segment 1300G and the designated direction 1310. The angled portions 1306 of other route segments 1300 may be associated with other designated headings, such as the designated headings 1308B, 1308D, and the like. The memory unit 112 of the vehicle 102 may store an association (e.g., list, table, database, or other memory structure) between the different route segments 1300 at the intersection 1302 and the fixed, designated headings 1308 along which the angled portions 1306 of the route segments 1300 extend.

The measured headings of the vehicle 102 (as obtained from data acquired by the location determining system 126) may be compared with the designated headings 1308 of the angled portions 1306 of the different route segments 1300 in order to determine which route segment 1300 that the vehicle 102 is actually traveling along and/or to confirm if the route segment 1300 that the vehicle 102 is traveling along corresponds to (e.g., is the same as) the route segment 1300 designated by a trip plan for the vehicle 102. The control unit 110 (e.g., the identification module 118 of the control unit 110) can identify which route segment that the vehicle 102 is traveling along based on a comparison between the measured heading of the vehicle 102 and the designated headings 1308 of the route segments 1300. For example, if a measured heading more closely matches one of several designated headings associated with different route segments at an intersection, then the route segment that is associated with the designated heading that more closely matches the measured heading (e.g., relative to the other designated headings) may be identified as the actual route segment on which the vehicle 102 is traveling.

The control unit 110 can compare the measured heading of the vehicle 102 to the designated headings 1308 of the route segments 1300 that meet at the intersection 1302 when the vehicle 102 approaches the intersection 1302, when the vehicle 102 is traveling within (e.g., over) the intersection 1302, and/or when the vehicle 102 exits the intersection 1302 to determine which route segment 1300 the vehicle 102 is traveling along. For example, when the vehicle 102 is traveling toward and comes within a designated distance from the intersection 1302, the control unit 110 may identify the measured heading of the vehicle 102. This measured heading may be referred to as a measured heading of approach. The measured heading of approach can be compared to the designated headings 1308 associated with the route segments 1300 at the intersection 1302 in order to determine which route segment 1300 that the vehicle 102 is traveling along. The measured heading of approach may be measured only when the vehicle 102 is on the angled portion 1306 of a route segment 1300 in one embodiment, as the non-intersecting portions 1304 of the route segments 1300 may have identical or substantially identical designated headings such that the control unit 110 is unable to determine which route segment 1300 the vehicle 102 is traveling on. Conversely, obtaining the measured heading of approach while the vehicle 102 is on the angled portion 1306 can allow for a more meaningful comparison with the designated headings 1308, as the designated headings 1308 of the angled portions 1306 of the route segments 1300 differ from each other. The control unit 110 can compare the measured heading of approach with the designated headings 1308 and determine which designated heading 1308 more closely matches the measured heading of approach. The route segment 1300 having the angled portion 1306 with this designated heading 1308 can be identified by the control unit 110 as the route segment 1300 being traveled on by the vehicle 102.

When the vehicle 102 is traversing over the intersection 1302 (e.g., when the vehicle 102 is within a designated distance of the actual meeting location of the route segments 1300), the control unit 110 may identify the measured heading of the vehicle 102. This measured heading may be referred to as a measured heading of traverse. The measured heading of traverse can be compared to the designated headings 1308 associated with the route segments 1300 within the intersection 1302 in order to determine which route segment 1300 that the vehicle 102 is traveling along. The control unit 110 can compare the measured heading of approach with the designated headings 1308 of the angled portions 1306 of the route segments 1300 within the intersection 1302 and determine which designated heading 1308 more closely matches the measured heading of traverse. The route segment 1300 having the angled portion 1306 with this designated heading 1308 can be identified by the control unit 110 as the route segment 1300 being traveled on by the vehicle 102.

The control unit 110 also or alternatively may identify the measured heading when the vehicle 102 exits the intersection 1302, but before the vehicle 102 reaches the non-intersecting portion 1304 of the route segment 1300 being traveled along. For example, the control unit 110 may factor in the locations of the route segments 1300 (e.g., the locations of the angled portions 1306), the speed of the vehicle 102, the location of the location determining system 126 in the vehicle 102, and the like, in order to determine when the vehicle 102 exits the intersection 1302 but before the vehicle 102 has entered onto a non-intersecting portion 1304 of the route segments 1300. In one embodiment, the control unit 110 may know (e.g., from information stored in the memory unit 112) the shortest distance between the intersection 1302 and the non-intersecting portions 1304 of the route segments 1300 on the side of the intersection 1302 that the vehicle 102 is traveling toward. Using this distance, the vehicle speed, the location of the location determining system 126, and/or other information, the control unit 110 may determine when to acquire the measured heading so that the measured heading represents the direction of travel of the vehicle 102 between the intersection 1302 and the non-intersecting portion 1304 of the route segment 1300 that the vehicle 102 is traveling along. This measured heading may be referred to as a measured heading of exit. The measured heading of exit can be compared to the designated headings 1308 associated with the angled portions 1306 of the route segments 1300 at the intersection 1302 in order to determine which route segment 1300 that the vehicle 102 is traveling along upon exit from the intersection 1302. The control unit 110 can compare the measured heading of exit with the designated headings 1308 of the angled portions 1306 of the route segments 1300 outside of the intersection 1302 along the direction of travel of the vehicle 102 and determine which designated heading 1308 more closely matches the measured heading of exit. The route segment 1300 having the angled portion 1306 with this designated heading 1308 can be identified by the control unit 110 as the route segment 1300 being traveled on by the vehicle 102 upon exiting the intersection 1302.

The control unit 110 can determine when to identify the measured heading of the vehicle 102 based on a measured location of the vehicle 102 as obtained by the location determining system 126 or by another technique, such as by knowing an expected time of arrival at the intersection based on a known layout of the route segments and intersections, a known path that the vehicle 102 is scheduled to travel along, and/or a scheduled time that the vehicle 102 is to arrive at the intersection. For example, the control unit 110 can determine when the vehicle 102 is approaching the intersection based on the measured location of the vehicle 102, the speed of the vehicle 102 and the time since the vehicle 102 passed a reference location that is a known distance from the intersection, based on input from an operator or monitoring system (e.g., an onboard system that determines when the vehicle 102 passes a reference location, such as by sensing a tag or other object disposed near the route segment), or the like. The control unit 110 can then obtain the measured heading of approach of the vehicle 102. The control unit 110 may alternatively or additionally determine the measured heading of traverse during a time period when the vehicle 102 is actually traveling over the intersection 1302. The control unit 110 can determine when the vehicle 102 is traveling within the intersection 1302 using a geographic position of the vehicle 102 as identified by location data acquired by the location determining system 126. Additionally or alternatively, the control unit 110 can determine when the vehicle 102 is within the intersection 1302 using the speed of the vehicle 102 and an elapsed time since the vehicle 102 entered into the intersection 1302. The control unit 110 can alternatively or additionally determine the measured heading of exit as the vehicle 102 exits the intersection 1302 and is traveling toward the non-intersecting portion 1304 of the route segment 1300 on which the vehicle 102 is traveling. For example, the size of the intersection 1302 may be known (e.g., by being previously designated in the memory unit 112) so that the control unit 110 can calculate when the vehicle 102 is traveling over the intersection 1302.

The control unit 110 can determine when the vehicle 102 has exited the intersection 1302 and has not yet reached the non-intersecting portion 1304 of the route segment 1300 using a geographic position of the vehicle 102 as identified by location data acquired by the location determining system 126. Additionally or alternatively, the control unit 110 can determine when the vehicle 102 has exited the intersection 1302 and has not yet reached the non-intersecting portion 1304 of the route segment 1300 using the speed of the vehicle 102 and an elapsed time since the vehicle 102 entered into and/or traveled over the intersection 1302. For example, the intersection 1302 may be associated with one or more designated distances that represent lengths along the angled portions 1306 of the route segments 1300 from the intersection 1302 to the non-intersection portions 1304 of the route segments 1300. The control unit 110 can use the speed of the vehicle 102, the time elapsed since the vehicle 102 traveled over the intersection 1302, and one or more of these designated distances (such as the shortest designated distance of the angled portions 1306 of the intersection 1302 or of the angled portions 1306 on the side of the intersection 1302 that the vehicle 102 is traveling toward) to determine when to obtain the measured heading of exit.

The control unit 110 can compare the measured heading of approach, the measured heading of traverse, and/or the measured heading of exit to one or more designated headings of the route segment 1300 to determine and/or confirm which route segment 1300 that the vehicle 102 is traveling along. For example, the control unit 110 can verify if the designated route segment (e.g., as selected by the operator or included in a trip plan) is the route segment 1300 that the vehicle 102 is actually traveling on after moving through the intersection 1302.

Alternatively or additionally, the control unit 110 may determine whether the route segment 1300 on which the vehicle 102 is traveling is the designated route segment (e.g., as selected by the operator and/or directed by a trip plan) by examining a difference between one or more of the measured headings of the vehicle 102 (e.g., the measured headings of approach, traverse, and/or exit) and the designated headings associated with the designated route segment. As described above, a designated route or route segment can include the route segment selected or confirmed by the operator and/or the route segment designated for travel by a trip plan. This designated route segment can be associated with designated headings for the angled portions 1306 of the designated route segment. The control unit 110 can compare the measured heading of approach to the designated heading of the angled portion 1306 of the designated route segment to identify one or more differences between the measured and designated headings. Additionally or alternatively, the control unit 110 can compare the measured headings of traverse and/or exit with corresponding designated headings of the designated route segment. The control unit 110 (e.g., the orientation module 116 of the control unit 110) can calculate one or more differences between the measured headings and the designated headings of the route segments. These differences can be referred to as heading differences. If one or more portions of the designated route segment is curved, then several designated headings (e.g., a sequential series of headings) can be associated with the designated route segment and can be compared with the measured headings of the vehicle 102. Based on the differences between the designated headings and the measured headings, the control unit 110 (e.g., the identification module 118) can determine if the vehicle 102 is traveling on the designated route segment. For example, if the differences exceed one or more thresholds (or at least a designated number of the differences exceeds the threshold), then the control unit 110 may determine that the vehicle 102 is not traveling on the designated route segment. Alternatively, if the differences do not exceed one or more thresholds (or fewer than the designated number of the differences exceeds the threshold), then the control unit 110 may confirm that the vehicle 102 is traveling on the designated route segment.

The determination of whether the vehicle 102 is actually traveling on a designated route segment can be used to confirm whether the operator is traveling according to a trip plan for the vehicle 102. In one embodiment, when the vehicle 102 approaches an intersection, the control unit 110 can prompt the operator of the vehicle 102 to provide input that represents which section of track that the vehicle 102 will travel along after traveling through the intersection. The control unit 110 can verify which route segment that the vehicle 102 actually travels on in order to determine if the operator is controlling the vehicle 102 to travel on the route segments of the trip plan or on other route segments. If the vehicle 102 travels on route segments other than those of the trip plan, the trip plan can be modified to account for the vehicle 102 being on a different route segment.

In one embodiment, the control unit 110 may only examine the measured headings from data acquired by the location determining system 126 and/or the location determining system 126 may only acquire data used to determine the measured heading when the vehicle 102 approaches and/or travels through a location of interest, such as an intersection 504. Alternatively, the control unit 110 may periodically examine the measured headings and/or examine the measured headings when prompted by the operator or other system of the vehicle 102.

The control unit 110 may examine the measured headings at rates or times based on the speed of the vehicle 102 and/or a known layout of the route segments. For example, the control unit 110 may include or be coupled with one or more speed sensors and/or determine the speed of the vehicle 102 from two or more measurements by the location determination system 126. Using the known layout or map of the intersections and route segments, the control unit 110 may use the speed of the vehicle 102 to determine when to examine the measured headings.

In another aspect, in addition to or in place of using the measured headings from the location determining system 126 to determine the route segment on which the vehicle 102 is traveling, the location determining system 126 and/or the control unit 110 may determine a derived heading of the vehicle 102 based on sensed locations of the vehicle 102. The location determining system 126 may obtain multiple measurements of the location (e.g., the longitude and latitude) of the vehicle 102. The location determining system 126 and/or the control unit 110 can determine differences between two or more of these measurements to derive the heading of the vehicle 102. For example, a first sensed location of the vehicle 102 may be 48.79, −79.94 (e.g., longitude, latitude) and a second sensed location of the vehicle 102 (obtained after the first sensed location is obtained) may be 48.79, −79.97. The location determining system 126 and/or the control unit 110 can compare these two sensed locations and determines that the vehicle 102 is moving in a generally westward direction. This derived heading (e.g., west or 90 degrees from true north) may be used in place of or in addition to the measured heading described above. For example, the derived heading can be combined (e.g., averaged) with the measured heading and/or used as a second check on the accuracy or the measured heading.

The control unit 110 may use heading data and/or measured headings from the location determining system 126 in addition to or in place of using the sensed locations because the heading data and/or measured headings may be more accurate than the derived headings calculated from the sensed locations. The sensed locations obtained by the location determining system 126 may be impacted by ionosphere delay, which can cause the sensed locations to have decreased accuracy. The heading data and/or measured headings, however, may not be impacted by ionosphere delay as the heading data and/or measured headings can be determined using Doppler shifts in a carrier frequency used by the location determining system 126. As this carrier frequency may not be affected by the ionosphere delay (unlike positional data being carried by the carrier frequency and on which the sensed locations are determined), the heading data and/or measured headings may be more accurate.

Similar to as described above, the system 100 may use the measured headings of the vehicle 102 to verify which route segment that the vehicle 102 is traveling along, such as when the vehicle 102 is operating in a PTC configuration. The measured heading can be compared to similar information provided wirelessly from wayside equipment or through a wired connection with the rails of the track in order to verify the information. If the identification of a track segment that is provided by wayside equipment and/or through the rails of the track does not correspond to the identification of the track segment that is based on the measured heading, then the control unit 110 can communicate an alarm signal to the operator of the vehicle and/or to an off-board location to warn others of the mismatch in information.

With respect to the example shown and described above in connection with FIG. 9, the control unit 110 may monitor the measured headings obtained from data provided by the location determining system 126 to determine if the vehicle 900 changes lanes 904 and/or which lane 904 the vehicle 900 travels to, similar to as described above.

As described above, the location determining system 126 may have a measurement ambiguity limits the resolution of the system 126. The control unit 110 may be able to distinguish between the route segments that are spaced closer together than the measurement ambiguity of the system 126 using the measured headings of the vehicle 102. For example, while the measurement ambiguity of the system 126 may prevent identification of which route segment is being traveled along based on a sensed location of the vehicle 102, the route segments may be associated with different designated headings such that the measured heading may be used to identify the route segment being traveled on.

In one embodiment, the control unit 110 and/or the location determining system 126 may self-calibrate or correct the measured heading and/or heading data from the location determining system 126. The curvature and/or orientation of the route segments at an intersection may be known, as described above. Once the control unit 110 determines which route segment that the vehicle 102 is traveling along, the control unit 110 and/or location determining system 126 can acquire one or more additional measured headings of the vehicle 102. These additional measured headings can be compared to the known, fixed heading (e.g., curvature and/or orientation) of the route segment. Differences between the known, fixed heading of the route segment and the additional measured heading(s) may be used to correct subsequently acquired measured headings. For example, if the differences reveal an error of 0.5 degrees between the measured heading of the vehicle 102 and the known heading of the route segment, then subsequently acquired measured headings may be corrected by 0.5 degrees.

One or more intersections that the vehicle 102 may travel through may have route segments or portions of route segments that are not associated with a designated heading. In order for the control unit 110 to determine which route segment that the vehicle 102 is traveling on and/or to confirm whether the vehicle 102 is traveling on a designated route segment (e.g., as selected by the operator or directed by a trip plan), the control unit 110 can estimate spatial changes in location of the vehicle 102 when the vehicle 102 crosses through an intersection. The control unit 110 can then determine the route segment being traveled on based on the spatial changes in location.

Figure 14:
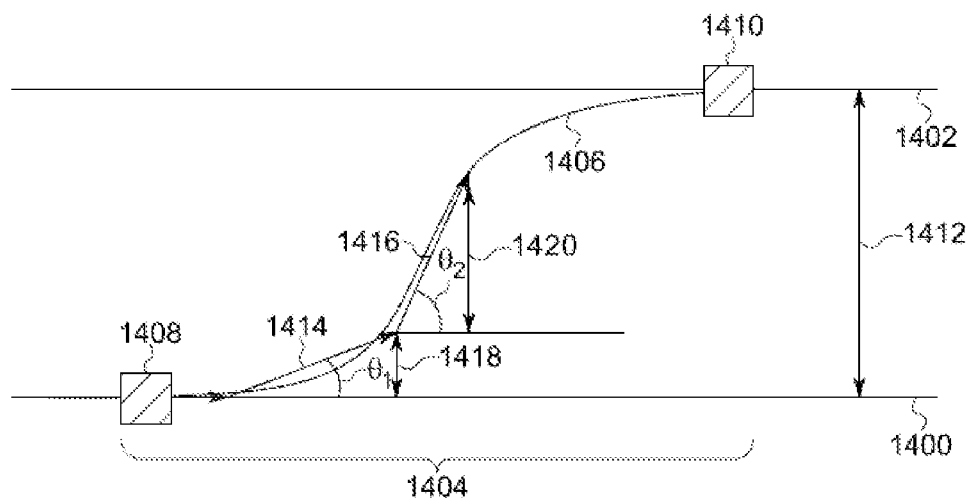
FIG. 14 is a schematic diagram of another example of several route segments meeting at an intersection.

FIG. 14 is a schematic diagram of another example of several route segments 1400, 1402 meeting at an intersection 1404. In the illustrated example, the route segments 1400, 1402 are non-intersecting route segments laterally spaced apart by a separation distance 1412. The route segments 1400, 1402 are joined by an interconnecting portion 1404 of the route segments 1400, 1402. The interconnecting portion 1404 couples the route segments 1400, 1402 such that the vehicle 102 can travel from the route segment 1400 or 1402 to the other route segment 1402 or 1400 by traveling over the interconnecting portion 1404. The intersection 1404 shown in FIG. 14 can be defined as including the interconnecting portion 1404 and extending from a meeting location 1408 where the route segment 1400 meets the interconnecting portion 1404 to another meeting location 1410 where the route segment 1402 meets the interconnecting portion 1404.

During travel of the vehicle 102, the vehicle 102 may travel from the route segment 1400 to the route segment 1402 (or vice-versa) using the interconnecting portion 1402. The interconnecting portion 1402 may not be associated with one or more designated headings such that the control unit 110 can compare measured headings of the vehicle 102 to determine if the vehicle 102 has traveled between the route segments 1400, 1402 as described above. Instead, the separation distance 1412 between the route segments 1400, 1402 may be known by the control unit 110 (e.g., by a designated separation distance being stored in the memory unit 112 of the vehicle 102), and the control unit 110 can use one or more measured headings of the vehicle 102 and the actual speed of the vehicle 102 to determine if the vehicle 102 has traveled from one route segment 1400 or 1402 to the other route segment 1402 or 1400.

In one example, the control unit 110 can determine when the vehicle 102 approaches the meeting location 1408 based on sensed locations from the location determining system 126. The control unit 110 can determine the speed of the vehicle 102 (e.g., from one or more speed sensors of the propulsion system of the vehicle 102) and monitor measured headings 1414, 1416 of the vehicle 102 as the vehicle 102 passes the meeting location 1408. The control unit 110 can obtain several measured headings 1414, 1416 or obtain a single measured heading. Although only two measured headings 1414, 1416 are shown in FIG. 14, the control unit 110 may acquire more measured headings 1414, 1416 or a single measured heading.

The control unit 110 can determine angles $\theta_1$, $\theta_2$ of the measured headings 1414, 1416 that represent the angle between the measured headings 1414, 1416 and the orientation of the route segment 1400 from which the vehicle 102 entered onto the interconnecting portion 1406. The orientation of the route segment 1400 may be known based on a route layout or manually designated and stored in the memory unit 112 of the vehicle 102. From this known or designated orientation, the angles $\theta_1$, $\theta_2$ may be determined (e.g., as the angular difference between the measured headings 1414, 1416 and the orientation of the route segment 1400).

The measured headings 1414, 1416 can be represented as vectors having orientations that represent the angles $\theta_1$, $\theta_2$ and magnitudes (e.g., lengths) that represent the distance traveled by the vehicle 102 at the corresponding heading 1414, 1416. For example, the vectors may be longer for vehicles 102 traveling at faster speeds and/or at the corresponding measured heading 1414, 1416 for longer periods of time, while the vectors may be shorter for slower vehicles 102 and/or vehicles 102 traveling at the corresponding measured heading 1414, 1416 for shorter time periods. The length of the vectors representing the measured headings 1414, 1416 may be determined based on the following relationship:

$$L = v*t \qquad \text{(Eqn. \#3)}$$

where L represents the length of the vector of the measured heading, v represents the speed of the vehicle 102, and t represents a time period. The time period may be a designated time period (e.g., a fixed time or a time that varies based on the speed of the vehicle 102), a time period between when the measured headings 1414, 1416 are acquired or determined (e.g., based on a sampling rate), or another time period.

Once the vectors of the measured headings 1414, 1416 are determined, the control unit 110 (e.g., the orientation module 116) can identify displacement distances 1418, 1420 of the corresponding measured heading 1414, 1416. The displacement distances 1418, 1420 represent estimated distances that the vehicle 102 moves from the route segment 1400 toward the route segment 1402. In one embodiment, the displacement distances 1418, 1420 may be estimated using the following relationship:

$$d_s = L \times \sin(\theta) \qquad \text{(Eqn. \#4)}$$

where $d_S$ represents the displacement distance associated with a measured heading, L represents the magnitude (e.g., length) of the vector associated with the measured heading, and $\theta$ represents the angle associated with the measured heading (e.g., the angle $\theta_1$ or $\theta_2$ in the illustrated example).

The control unit 110 can calculate one or more of the displacement distances 1416, 1418 in order to determine if the sum of the displacement distances 1416, 1418 approaches or is at least equal to the separation distance 1412. For example, the control unit 110 can calculate and sum the displacement distances 1416, 1418 when the vehicle 102 reaches the meeting location 1408 until the vehicle 102 reaches the meeting location 1410. Alternatively or additionally, the control unit 110 can calculate and sum the displacement distances 1416, 1418 from when the measured heading of the vehicle 102 deviates from the designated heading associated with the route segment 1400 until the measured heading no longer deviates from the designated heading of the route segment 1400 and/or 1402. Alternatively or additionally, the control unit 110 can calculate and sum the displacement distances 1416, 1418 over a time period that starts when the vehicle 102 reaches the meeting location 1408 and/or when the measured heading of the vehicle 102 deviates from the designated heading of the route segment 1400. This time period may last for a designated length of time or a length of time that is based on the speed of the vehicle 102 and/or the separation distance 1412. For example, the time period over which the displacement distances 1416, 1418 are summed may be shorter for faster moving vehicles 102 and longer for slowing moving vehicles 102. As another example, this time period may be shorter for smaller separation distances 1412 and longer for larger separation distances 1412.

The summed displacement distances 1416, 1418 can be compared to the separation distance 1412 (e.g., by the identification module 118 of the control unit 110) in order to determine if the summed displacement distances 1416, 1418 are within a designated, non-zero threshold (e.g., a designated distance or percentage) of the separation distance 1412. If the summed displacement distances 1416, 1418 are within the designated threshold, then the control unit 110 (e.g., the identification module 118) can determine that the vehicle 102 did move from the route segment 1400 to the route segment 1402. Otherwise, the control unit 110 may determine that the vehicle 102 remained on the route segment 1400 or moved to another route segment. For example, if the interconnecting portion 1406 is joined with more than two route segments, the control unit 110 may compare the summed displacement distances with different separation distances associated with the route segments to determine which route segment that the vehicle 102 is traveling on.

In the illustrated example, if the vehicle 102 does move from the route segment 1400 to the route segment 1402 by traveling along the interconnecting portion 1406, then the control unit 110 may calculate the displacement distances 1416, 1418 and determine that the sum of these displacement distances 1416, 1418 is within the designated threshold of the separation distance 1412. On the other hand, if the vehicle 102 remains on the route segment 1400 and does not travel along the interconnecting portion 1406, then the displacement distances calculated by the control unit 110 may be zero or relatively small such that a sum of the displacement distances is not within the designated threshold of the separation distance 1412. Consequently, the control unit 110 determines that the vehicle 102 remained on the route segment 1400 and did not travel along the interconnecting portion 1406.

While the embodiments described herein focus on the components of the system 100 being disposed onboard the vehicle 102, alternatively, one or more of the components may be disposed off-board (e.g., remote) from the vehicle 102. For example, the control module 110 and/or memory unit 112 may be disposed at a remote location, such as a dispatch facility, to receive output signals or data from the sensor 106 and/or location determining system 126, and to analyze the output signals, as described herein.

In another embodiment, a system (e.g., for verifying a route segment that a vehicle is traveling along) includes a first magnetic sensor and a control unit. The first magnetic sensor is configured to be coupled to the vehicle that travels in a network of plural route segments having fixed positions. The first magnetic sensor also is configured to generate an output signal based on an orientation of the first magnetic sensor relative to an external magnetic field. The control unit is configured to receive the output signal from the first magnetic sensor and an operator-designated route segment. The operator-designated route segment represents a selected route segment of the route segments that is identified by the operator as being the route segment on which the vehicle is traveling. The control unit also is configured to identify a directional heading of the vehicle based on the output signal from the first magnetic sensor and to determine an actual route segment of the routes segments in the network that the vehicle is actually traveling along based on the directional heading of the vehicle. The control unit is further configured to verify that the actual route segment on which the vehicle is actually traveling is the selected route segment.

In another aspect, the external magnetic field is earth's magnetic field.

In another aspect, the route segments include at least one of interconnected roads along which automobiles travel or interconnected tracks along which rail vehicles travel.

In another aspect, the route segments include a first route segment that intersects with at least a second route segment and a third route segment at an intersection. The control unit can be configured to determine which of the second route segment or the third route segment that the vehicle travels onto from the first route segment based on the directional heading of the vehicle and to determine if the second route segment or the third route segment is the operator-selected route segment.

In another aspect, the second route segment and the third route segment are separated by a distance that is no larger than a measurement ambiguity of a global positioning system (GPS) of the vehicle.

In another aspect, the system also includes a memory unit configured to be communicatively coupled with the control unit and to store relative geographic positions of the second route segment and the third route segment. The control unit is configured to determine which of the second route segment and the third route segment is traveled upon by the vehicle by comparing the directional heading of the vehicle to the relative geographic position of the second route segment and the relative geographic position of the third route segment.

In another aspect, the relative geographic positions of the second route segment and of the third route segment include an orientation of the second route segment relative to the first route segment and an orientation of the third route segment to the first route segment.

In another aspect, the control unit is configured to determine which of the route segments that the vehicle is traveling along when a global positioning system (GPS) of the vehicle is unable to at least one of identify a geographic location of the vehicle or identify which of the route segments that the vehicle is traveling along.

In another aspect, the control unit is configured to determine the directional heading of the vehicle based on the output signal from the first magnetic sensor when the vehicle is traveling in a covered tunnel and a location determination system of the vehicle is unable to determine the directional heading of the vehicle while the vehicle is in the covered tunnel. For example, when the vehicle enters a covered tunnel (which may include other geographic areas where a location determination system, such as a GPS system, is unable to determine the location and/or directional heading of the vehicle, such as a valley, an area between tall buildings or other structures, and the like), the control unit may use the output signals from the magnetic sensor to determine the location and/or directional heading of the vehicle. The control unit may switch to using the output signals of the magnetic sensor responsive to the vehicle entering the tunnel and/or the location determination system being unable to identify the location and/or directional heading of the vehicle.

In another aspect, the system also includes a global positioning system (GPS) configured to generate a location signal indicative of a geographic location of the vehicle. The control unit is configured to receive the location signal from the GPS and the output signal from the first magnetic sensor in order to identify at least one of which track of a group of tracks that the vehicle is traveling along or which lane of a road that the vehicle is traveling along.

In another aspect, the control unit is configured to examine the output signal from the first magnetic sensor in order to monitor mechanical vibrations of the vehicle.

In another aspect, the control unit is configured to monitor the mechanical vibrations of the vehicle by examining at least one of a frequency or a voltage of the output signal from the first magnetic sensor.

In another aspect, the control unit is configured to examine the output signal from the first magnetic sensor responsive to a location determination system of the vehicle determining that the vehicle is within a designated distance from an intersection of two or more of the route segments.

In another aspect, the system also includes at least a second magnetic sensor configured to be coupled to the vehicle. The first magnetic sensor and the second magnetic sensor are configured to be oriented relative to each other such that the first magnetic sensor generates the output signal to represent movement of the vehicle in a first two dimensional plane and the second magnetic sensor generates an output signal that represents movement of the vehicle in a different, second two dimensional plane.

In another embodiment, a method (e.g., for verifying a route segment that a vehicle is traveling along) includes receiving an operator-designated route segment from an operator of the vehicle when the vehicle is traveling in a network of plural route segments having fixed positions. The operator-designated route segment represents a selected route segment of the route segments that is identified by the operator as being the route segment on which the vehicle is traveling. The method also includes generating an output signal that is based on an orientation of a first magnetic sensor relative to an external magnetic field, identifying a directional heading of the vehicle based on the output signal, determining an actual route segment of the route segments that the vehicle is actually traveling along based on the directional heading of the vehicle, and comparing the actual route segment with the selected route segment to determine if the vehicle is traveling on the selected route segment.

In another aspect, the external magnetic field is earth's magnetic field.

In another aspect, identifying the directional heading includes identifying where the vehicle is traveling along at least one of interconnected roads along which automobiles travel or interconnected tracks along which rail vehicles travel.

In another aspect, the route segments include a first route segment that intersects with at least a second route segment and a third route segment at an intersection. Determining which of the route segments that the vehicle is traveling includes determining which of the second route segment or the third route segment that the vehicle travels onto from the first route segment based on the directional heading of the vehicle.

In another aspect, determining which of the route segments that the vehicle is traveling along is performed when a global positioning system (GPS) of the vehicle is unable to at least one of identify a geographic location of the vehicle or identify which of the route segments that the vehicle is traveling along.

In another aspect, identifying the directional heading of the vehicle is performed when the vehicle is traveling in a covered tunnel and a location determination system disposed onboard the vehicle is unable to determine the directional heading of the vehicle.

In another aspect, the method also includes receiving a location signal from a global positioning system (GPS) that is indicative of a geographic location of the vehicle and identifying at least one of which track of a group of tracks that the vehicle is traveling along or which lane of a road that the vehicle is traveling along based on the location signal from the GPS and the output signal from the first magnetic sensor.

In another aspect, the method also includes monitoring the output signal from the first magnetic sensor in order to identify mechanical vibrations of the vehicle.

In another aspect, identifying the directional heading of the vehicle based on the output signal occurs responsive to the vehicle moving to within a designated distance from an intersection of two or more of the route segments.

In another aspect, generating the output signal includes generating a first output signal from the first magnetic sensor that represents movement of the vehicle in a first two dimensional plane and generating a second output signal from a second magnetic sensor that represents movement of the vehicle in a different, second two dimensional plane.

In another embodiment, another system (e.g., for verifying a track segment that a rail vehicle is traveling along) includes a magnetic sensor and a control unit. The magnetic sensor is configured to be coupled to a rail vehicle and to generate an output signal representative of an orientation of the magnetic sensor relative to an external magnetic field. The control unit is configured to be communicatively coupled with the magnetic sensor and to receive the output signal from the magnetic sensor and an operator-selected track segment representative of a selected track segment on which the operator identifies that the rail vehicle is traveling. The control unit is further configured to determine a directional heading of the rail vehicle based on the output signal of the magnetic sensor. The control unit also is configured to determine an actual track segment on which the rail vehicle is actually traveling after the rail vehicle passes through an intersection of track segments based on the directional heading and based on relative orientations of the track segments. The control unit is further configured to compare the actual track segment with the selected track segment to verify whether the rail vehicle is traveling on the selected track segment.

In another aspect, at least a first track segment and a second track segment of the track segments are separated by a distance that is no larger than a measurement ambiguity of a location determining system of the rail vehicle.

In another aspect, the control unit is configured to determine which of the track segments that the rail vehicle is traveling along when a location determining system of the rail vehicle is unable to at least one of identify a geographic location of the rail vehicle or identify which of the track segments that the rail vehicle is traveling along.

In another aspect, the control unit is configured to determine the directional heading of the rail vehicle based on the output signal from the magnetic sensor when the rail vehicle is traveling in a covered tunnel and a location determination system of the rail vehicle is unable to determine the directional heading of the rail vehicle.

In another aspect, the control unit is configured to examine the output signal from the magnetic sensor in order to monitor mechanical vibrations of the rail vehicle.

In another embodiment, a system (e.g., for confirming a direction of travel of a vehicle) includes a location determining system and a control unit. The location determining system is configured to be coupled to a vehicle and to obtain data representative of a measured heading of the vehicle. The measured heading is representative of a direction of travel of the vehicle. The control unit is configured to receive a designated route segment of a set of route segments having fixed positions at an intersection. The designated route segment is at least one of selected by operator input or provided by a trip plan that designates operational settings of the vehicle for a trip. The designated route segment represents which of the route segments in the set that the vehicle is to travel along upon exiting the intersection. The control unit is configured to compare the measured heading of the vehicle with designated headings that are associated with the respective route segments in the set to verify whether the vehicle is actually traveling on the designated route segment when the vehicle exits the intersection.

In another aspect, the measured heading includes a measured heading of traverse that represents the direction of travel of the vehicle as the vehicle travels over the intersection.

In another aspect, the route segments in the set include non-intersecting portions and angled portions that meet at the intersection and that extend from the non-intersecting portions to the intersection. The measured heading can include a measured heading of exit that represents the direction of travel of the vehicle on a first angled portion of the angled portions of the route segments after the vehicle has exited the intersection.

In another aspect, the measured heading includes one or more of a measured heading of approach that represents the direction of travel of the vehicle as the vehicle approaches the intersection and before entering the intersection, a measured heading of traverse that represents the direction of travel of the vehicle as the vehicle travels over the intersection, or a measured heading of exit that represents the direction of travel of the vehicle after the vehicle exits the intersection.

In another aspect, the route segments in the set include at least one of interconnected roads along which automobiles travel or interconnected tracks along which rail vehicles travel.

In another aspect, the route segments in the set include a first route segment that intersects with at least a second route segment and a third route segment at the intersection. The control unit is configured to determine which of the second route segment or the third route segment that the vehicle travels onto from the first route segment based on the measured heading of the vehicle.

In another aspect, the second route segment and the third route segment are separated by a distance that is no larger than a measurement ambiguity of the location determining system of the vehicle. The measurement ambiguity representative of a minimum separation distance from a first location to a different, second location that the location determining system can distinguish between.

In another aspect, the system also includes a memory unit that is configured to be communicatively coupled with the control unit and to store the designated headings associated with the respective route segments in the set. The control unit is configured to determine which of the route segments in the set is traveled upon by the vehicle by determining which of the designated headings more closely matches the measured heading.

In another aspect, the system also includes a memory unit that is configured to be communicatively coupled with the control unit and to store at least a first designated heading of the designated headings. The first designated heading represents one or more orientations of the designated route segment. The control unit is configured to determine one or more differences between the first designated heading and the measured heading in order to verify whether the vehicle is traveling on the designated route segment.

In another aspect, the location determining system includes a global positioning system (GPS) receiver.

In another aspect, the control unit is configured to examine the measured heading from the location determining system responsive to the vehicle moving to within a designated distance from the intersection.

In another aspect, the control unit is configured to compare the measured heading of the vehicle with a known, fixed orientation of the designated route segment to determine a measurement error. The control unit can be configured to use the measurement error to correct one or more subsequently obtained measured headings.

In another embodiment, a method (e.g., for verifying which route segment is being traveled by a vehicle) includes obtaining a designated route segment of a set of route segments that meet at an intersection. The designated route segment represents which of the route segments in the set that a vehicle is to travel along upon exiting the intersection. The designated route segment is provided by at least one of operator input or a trip plan that designates operational settings of the vehicle for a trip. The method also includes identifying a measured heading of the vehicle based on heading data obtained by a global positioning system (GPS). The measured heading is representative of a direction of movement of the vehicle. The method also includes determining if the vehicle is traveling on the designated route segment by comparing the measured heading with designated headings associated with the respective route segments in the set.

In another aspect, the measured heading includes a measured heading of traverse that is identified when the vehicle travels over the intersection.

In another aspect, the route segments in the set include non-intersecting portions and angled portions that meet at the intersection and that extend from the non-intersecting portions to the intersection. The measured heading can include a measured heading of exit that is identified when the vehicle is traveling on a first angled portion of the angled portions of the route segments and after the vehicle has exited the intersection.

In another aspect, the measured heading includes one or more of a measured heading of approach that is identified as the vehicle approaches the intersection and before entering the intersection, a measured heading of traverse that is identified as the vehicle travels over the intersection, or a measured heading of exit that is identified after the vehicle exits the intersection.

In another aspect, the route segments in the set include roads along which automobiles travel or tracks along which rail vehicles travel.

In another aspect, the set of route segments includes a first route segment that intersects with at least a second route segment and a third route segment at the intersection. Determining if the vehicle is traveling on the designated route segment can include determining which of the second route segment or the third route segment that the vehicle travels onto from the first route segment based on the measured heading of the vehicle.

In another aspect, determining if the vehicle is traveling on the designated route segment is performed when the GPS of the vehicle is unable to determine a geographic location of the vehicle.

In another aspect, determining if the vehicle is traveling on the designated route segment includes identifying which of the designated headings more closely matches the measured heading.

In another aspect, the designated route segment is associated with a first designated heading of the designated headings. Determining if the vehicle is traveling on the designated route segment can include identifying one or more differences between the first designated heading and the measured heading in order to verify whether the vehicle is traveling on the designated route segment.

In another aspect, the method also includes comparing the measured heading with a known, fixed orientation of the designated route segment in order to identify a measurement error in the measured heading and modifying one or more subsequently acquired measured headings based on the measurement error.

In another aspect, identifying the measured heading of the vehicle occurs responsive to the vehicle moving to within a designated distance from the intersection.

In another embodiment, a system (e.g., for verifying whether a rail vehicle is traveling on a designated track segment) includes a global positioning system (GPS) and a control unit. The GPS receiver is configured to be coupled to a rail vehicle and to generate heading data representative of a direction of travel of the rail vehicle. The control unit is configured to be communicatively coupled with the GPS receiver and to obtain a measured heading of the rail vehicle during travel of the rail vehicle through an intersection of a set of track segments based on the heading data. The control unit also is configured to obtain a designated track segment of the set of track segments that is provided by at least one of operator input or a trip plan that designates operational settings of the rail vehicle for a trip. The designated track segment represents which of the track segments in the set that the rail vehicle is to travel along upon exiting the intersection. The control unit also is configured to determine whether the rail vehicle is traveling on the designated track segment after traveling through the intersection by comparing the measured heading of the rail vehicle with designated headings associated with respective track segments of the set of track segments.

In another aspect, the measured heading includes a measured heading of traverse that represents the direction of travel of the rail vehicle as the rail vehicle travels over the intersection.

In another aspect, the track segments in the set include non-intersecting portions and angled portions that meet at the intersection and that extend from the non-intersecting portions to the intersection. The measured heading can include a measured heading of exit that represents the direction of travel of the rail vehicle on a first angled portion of the angled portions of the track segments after the rail vehicle has exited the intersection.

In another aspect, the measured heading includes one or more of a measured heading of approach that represents the direction of travel of the rail vehicle as the rail vehicle approaches the intersection and before entering the intersection, a measured heading of traverse that represents the direction of travel of the rail vehicle as the rail vehicle travels over the intersection, or a measured heading of exit that represents the direction of travel of the rail vehicle after the vehicle exits the intersection.

In another aspect, the control unit is configured to determine which of the track segments on which the rail vehicle is actually traveling by determining which of the one or more designated headings more closely matches the measured heading.

In another aspect, the designated track segment is associated with a first designated heading of the designated headings. The control unit is configured to determine whether the rail vehicle is traveling on the designated track segment by identifying one or more differences between the first designated heading and the measured heading.

In another aspect, at least a first track segment and a second track segment of the set of track segments are separated by a distance that is no larger than a measurement ambiguity of the GPS receiver. The measurement ambiguity represents a minimum separation distance from a first location to a different, second location that the GPS receiver can distinguish between. The control unit is configured to determine which of the second track segment and the third track segment that the rail vehicle travels onto from the first route segment based on the measured heading of the rail vehicle.

In another aspect, the control unit is configured to determine whether the rail vehicle is traveling on the designated track segment when the GPS receiver is unable to at least one of identify geographic coordinates of the rail vehicle.

In another aspect, the control unit is configured to determine a measurement error of the heading data based on a difference between the measured heading and the designated heading of the designated track segment. The control unit also can be configured to modify subsequently identified measured headings based on the measurement error.

In another embodiment, a system (e.g., for determining which route segment that a vehicle is traveling along) includes a location determining system and a control unit. The location determining system is configured to be coupled to a vehicle and to obtain data representative of measured headings of the vehicle. The measured headings represent one or more directions of travel of the vehicle. The control unit is configured to receive a designated route segment of a set of route segments including at least a first route segment and a second route segment that are joined by an interconnecting route segment at an intersection. The first route segment and the second route segment are laterally spaced apart from each other by a separation distance. The control unit also is configured to determine one or more displacement distances based on the measured headings of the vehicle and one or more velocities of the vehicle. The displacement distances represent distances that the vehicle travels toward the second route segment from the first route segment along the interconnecting portion. Additionally, the control unit is configured to determine whether the vehicle traveled from the first route segment to the second route segment by comparing the one or more displacement distances to the separation distance.

In another aspect, the control unit is configured to sum the one or more displacement distances into a summed displacement distance and compare the summed displacement distance to the separation distance in order to determine if the vehicle traveled from the first route segment to the second route segment.

In another aspect, the control unit is configured to determine the one or more displacement distances based on the measured headings and the one or more velocities of the vehicle that are identified once the vehicle reaches a meeting location of the first route segment and the interconnecting portion of the route segments.

In another aspect, the first route segment and the second route segment are non-intersecting route segments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
a global positioning system (GPS) receiver configured to be coupled to a vehicle and to generate heading data representative of a direction of travel of the vehicle; and
a control unit configured to be communicatively coupled with the GPS receiver, the control unit configured to obtain the heading data of the vehicle from the GPS receiver for a time period that the vehicle travels along a path that extends through an intersection of a set of route segments, the control unit also configured to obtain a designated route segment of the set of route segments that is provided by at least one of operator input or a trip plan that designates operational settings of the vehicle for a trip, the designated route segment representing which of the route segments in the set that the vehicle is to travel along upon exiting the intersection,
wherein the control unit also is configured to determine whether the vehicle is traveling on the designated route segment by comparing the heading data of the vehicle as obtained from the GPS receiver with designated headings associated with respective route segments of the set of route segments,
wherein the route segments in the set include non-intersecting portions and angled portions that meet at the intersection and that extend from the non-intersecting portions to the intersection, and wherein the heading data represents a measured heading of exit that represents the direction of travel of the vehicle on a first angled portion of the angled portions of the route segments after the vehicle has exited the intersection, and
wherein the route segments in the set include a first route segment that intersects with at least a second route segment and a third route segment at the intersection, and the control unit is configured to determine which of the second route segment or the third route segment that the vehicle travels onto from the first route segment based on the heading data of the vehicle.

2. The system of claim 1, wherein the heading data represents the direction of travel of the vehicle as the vehicle travels over the intersection.

3. The system of claim 1, wherein the heading data includes one or more of a heading of approach that represents the direction of travel of the vehicle as the vehicle approaches the intersection and before entering the intersection, a heading of traverse that represents the direction of travel of the vehicle as the vehicle travels over the intersection, or a heading of exit that represents the direction of travel of the vehicle after the vehicle exits the intersection.

4. The system of claim 1, wherein the control unit is configured to determine which of the route segments on which the vehicle is actually traveling by determining which of the one or more designated headings more closely matches the heading data obtained from the GPS receiver.

5. The system of claim 1, wherein the designated route segment is associated with a first designated heading of the designated headings, and the control unit is configured to determine whether the vehicle is traveling on the designated route segment by identifying one or more differences between the first designated heading and the heading data obtained from the GPS receiver.

* * * * *